('12) United States Patent
Kim et al.

(10) Patent No.: US 10,120,428 B2
(45) Date of Patent: Nov. 6, 2018

(54) ELECTRONIC DEVICE AND METHOD FOR MANAGING POWER IN ELECTRONIC DEVICE

(71) Applicant: Samsung Electronics Co., Ltd., Gyeonggi-do (KR)

(72) Inventors: Byung-Wook Kim, Gyeonggi-do (KR); Sung-Geun Park, Gyeonggi-do (KR); Jin-Gil Yang, Gyeonggi-do (KR); Ki-Tae Lee, Gyeonggi-do (KR); Ju-Beam Lee, Gyeonggi-do (KR); Sun-Yong Kim, Seoul (KR); In-Hee Yoon, Gyeongsangnam-do (KR); Jin-Goo Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 10 days.

(21) Appl. No.: 15/054,879

(22) Filed: Feb. 26, 2016

(65) Prior Publication Data

US 2016/0252944 A1 Sep. 1, 2016

(30) Foreign Application Priority Data

Feb. 26, 2015 (KR) .................. 10-2015-0027126

(51) Int. Cl.
*H04W 52/02* (2009.01)
*G06F 1/28* (2006.01)
(Continued)

(52) U.S. Cl.
CPC ............ *G06F 1/28* (2013.01); *G06F 3/04817* (2013.01); *G06F 11/3062* (2013.01);
(Continued)

(58) Field of Classification Search
CPC .................. G06F 1/3234; H04W 52/0265
See application file for complete search history.

(56) References Cited

U.S. PATENT DOCUMENTS 9,229,522 B1* 1/2016 Tian ................. G06F 9/4418
2011/0040990 A1 2/2011 Chan et al.
(Continued)

FOREIGN PATENT DOCUMENTS

KR 1020120085724 8/2012
KR 1020130112617 10/2013
(Continued)

OTHER PUBLICATIONS

European Search Report dated Jun. 27, 2016 issued in counterpart application No. 16157418.1-1855, 10 pages.

*Primary Examiner* — Albert Wang
(74) *Attorney, Agent, or Firm* — The Farrell Law Firm, P.C.

(57) ABSTRACT

Disclosed is an electronic device including a battery, a display, a processor electrically connected with the battery and the display, and a memory which is electrically connected with the processor and stores at least one application, wherein the memory stores instructions which, when executed, cause the processor to monitor power consumption of the at least one application during execution of the at least one application in an off state of the display, and to display, on the display, information indicating whether a value of the power consumption exceeds a threshold selected during a selected time, based on at least a part of a result of the monitoring immediately after the display enters an on state.

20 Claims, 41 Drawing Sheets

(51) Int. Cl.
*G06F 11/30* (2006.01)
*G06F 3/0481* (2013.01)
*G06F 11/32* (2006.01)
*G06F 11/34* (2006.01)

(52) U.S. Cl.
CPC ....... *G06F 11/327* (2013.01); *H04W 52/0258* (2013.01); *H04W 52/0264* (2013.01); *G06F 11/3409* (2013.01); *G06F 2201/81* (2013.01); *G06F 2201/865* (2013.01); *Y02D 10/34* (2018.01); *Y02D 70/00* (2018.01); *Y02D 70/1222* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/26* (2018.01)

(56) References Cited

U.S. PATENT DOCUMENTS

| | | |
|---|---|---|
| 2014/0068314 A1 | 3/2014 | Kim |
| 2014/0173319 A1 | 6/2014 | Zeng |
| 2015/0233985 A1* | 8/2015 | Chen .................... G01R 21/133 702/60 |
| 2015/0241519 A1 | 8/2015 | Lee et al. |
| 2015/0338469 A1 | 11/2015 | Lee et al. |
| 2016/0048682 A1* | 2/2016 | Gou ....................... H04W 4/00 726/22 |

FOREIGN PATENT DOCUMENTS

| | | |
|---|---|---|
| KR | 1020150099284 | 8/2015 |
| KR | 1020150133460 | 11/2015 |
| WO | WO 2014/183455 | 11/2014 |

* cited by examiner

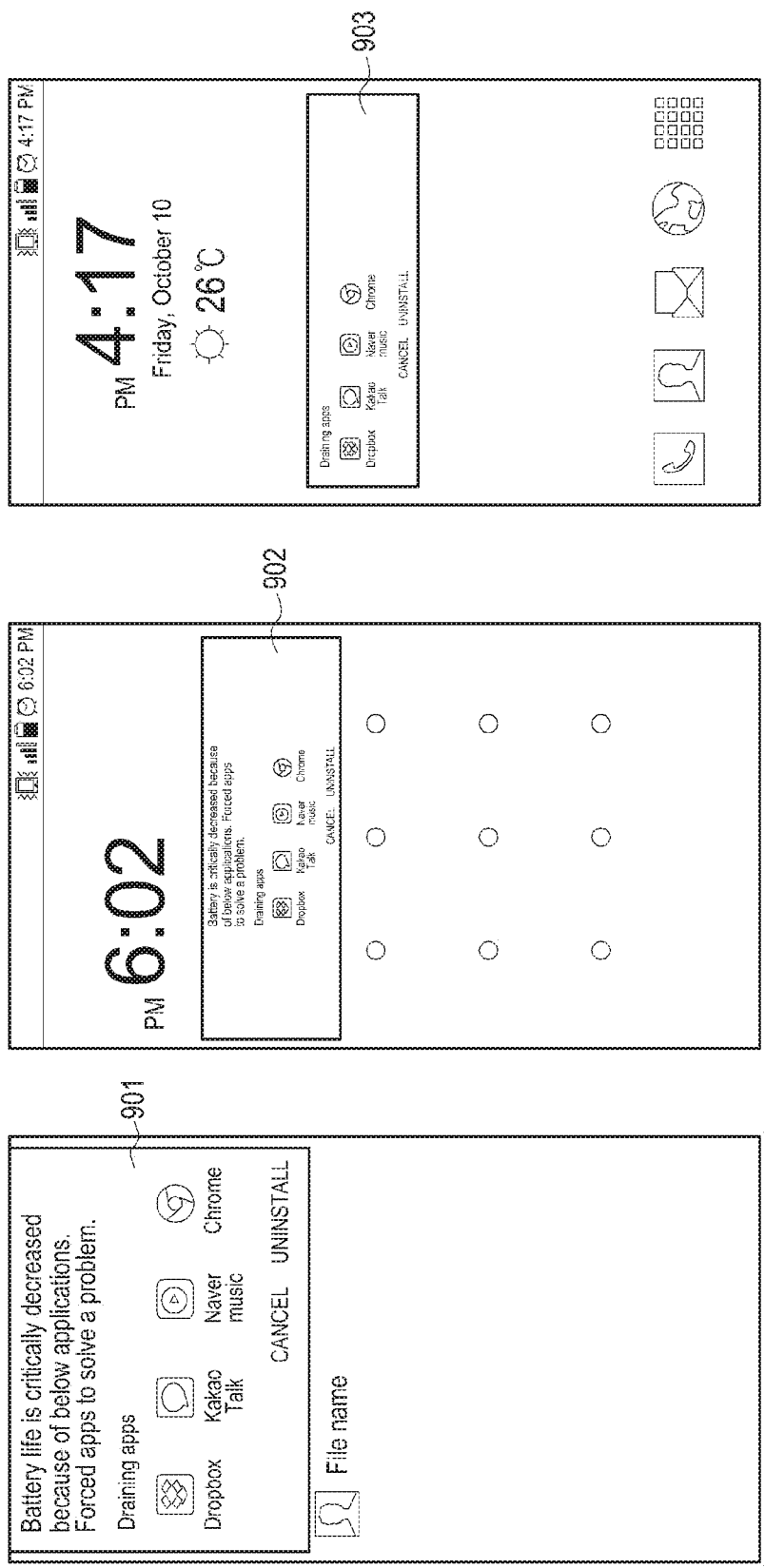

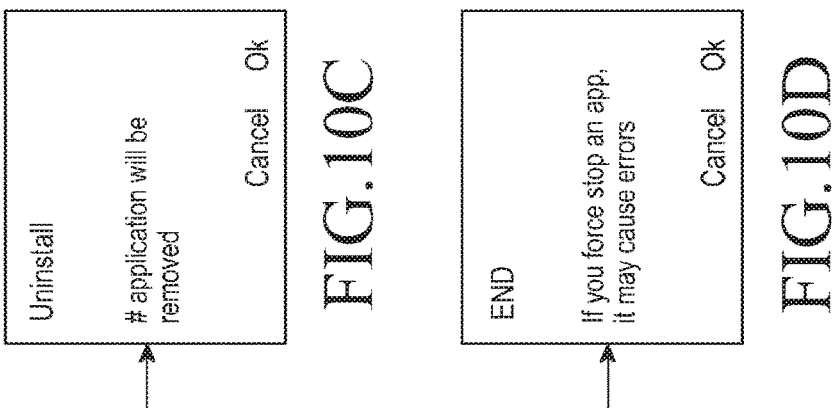
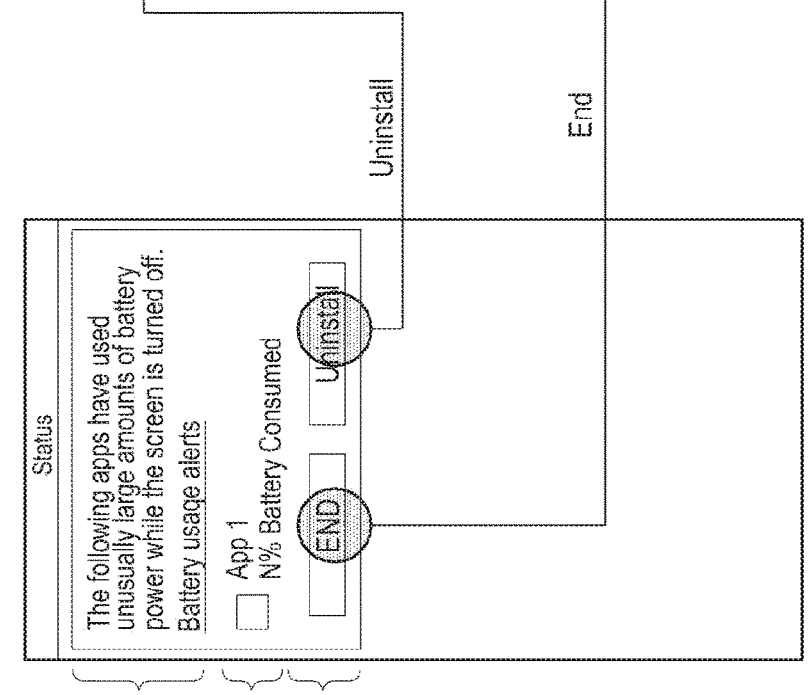
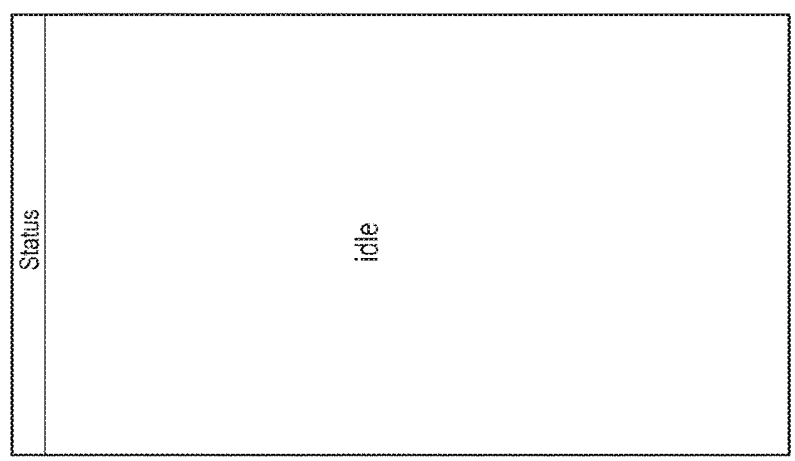
FIG. 10A  FIG. 10B  FIG. 10C  FIG. 10D

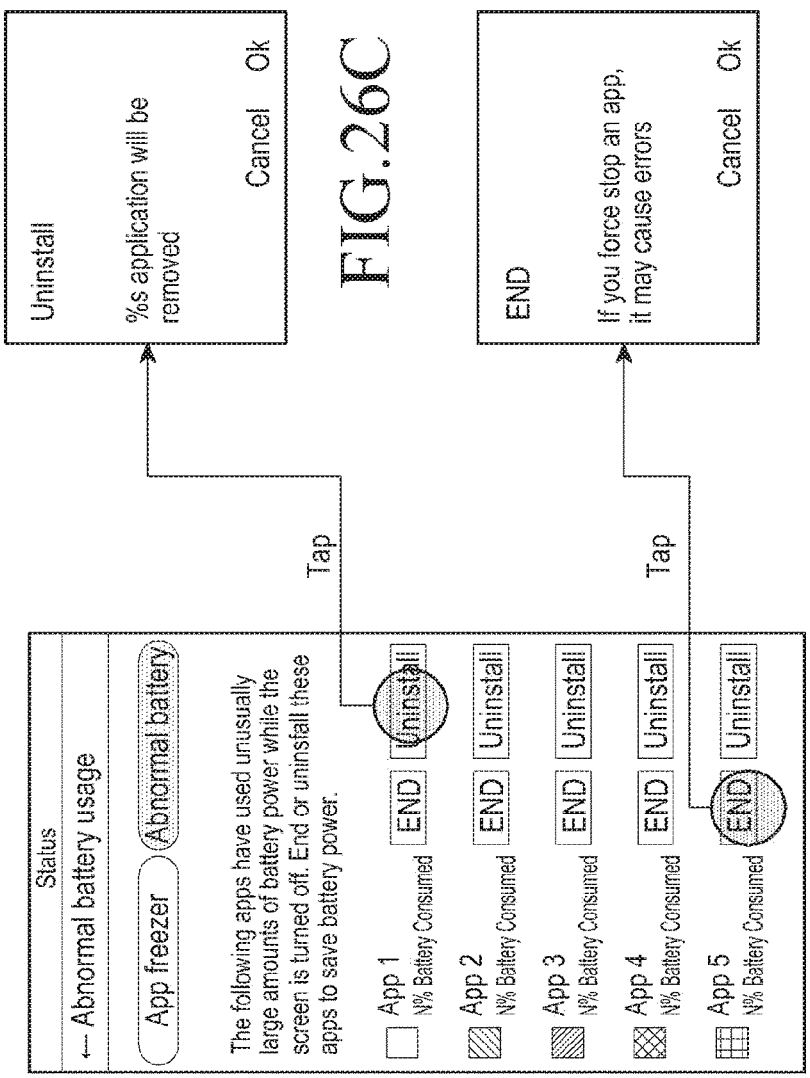
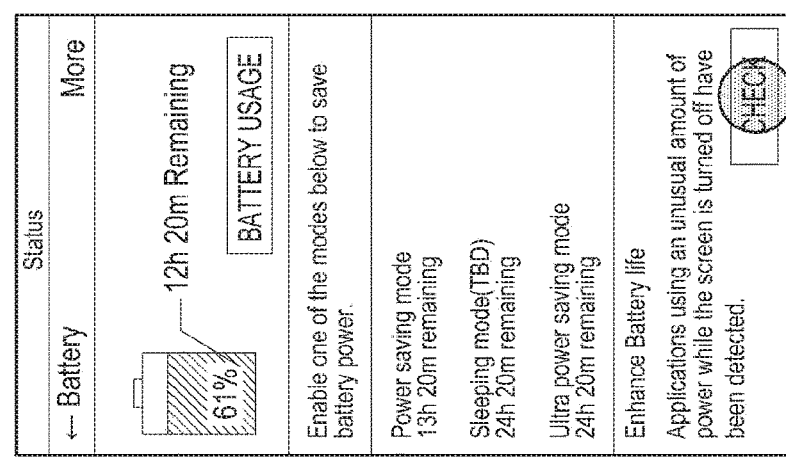
FIG.26A
FIG.26B
FIG.26C
FIG.26D

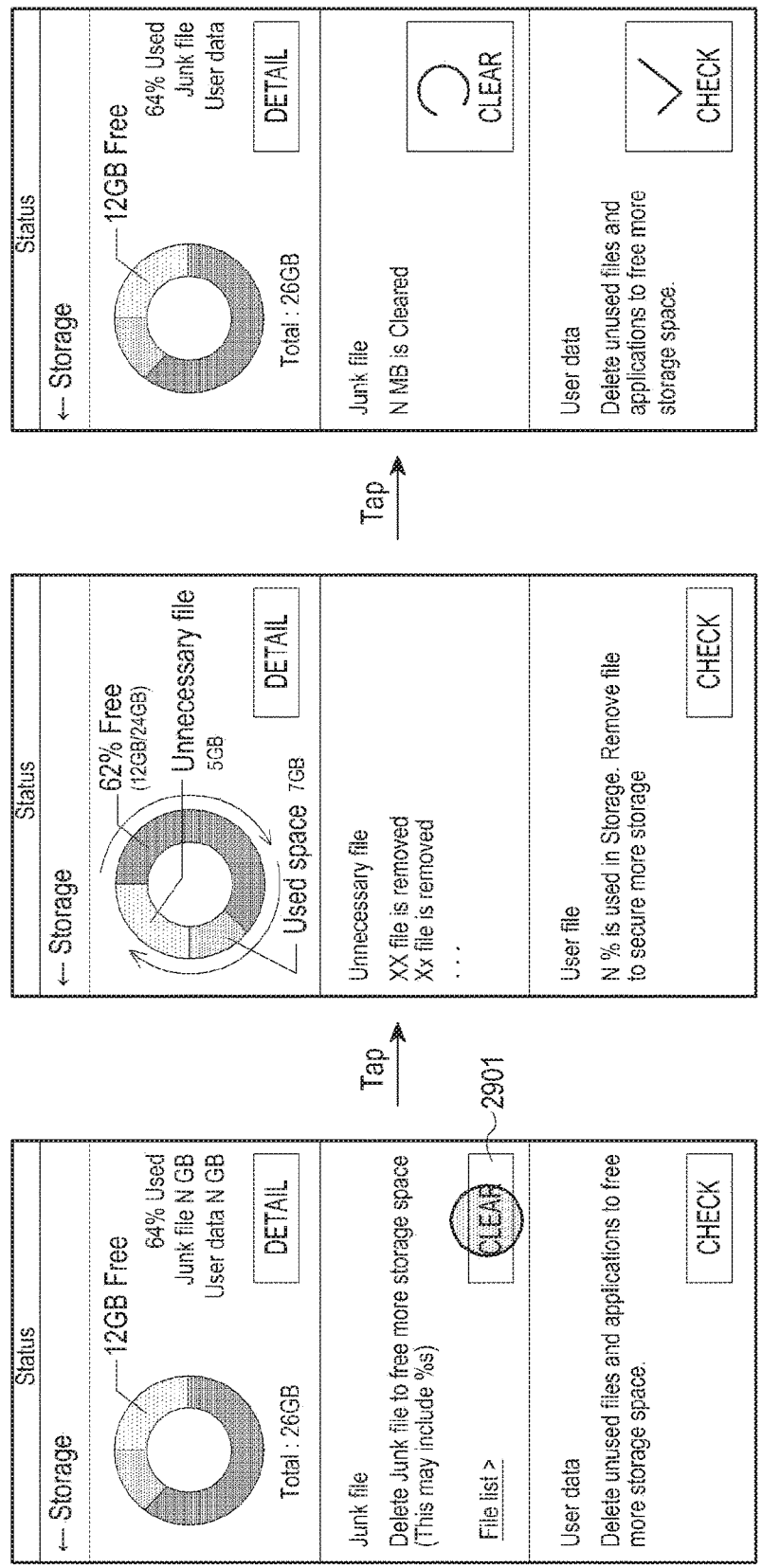

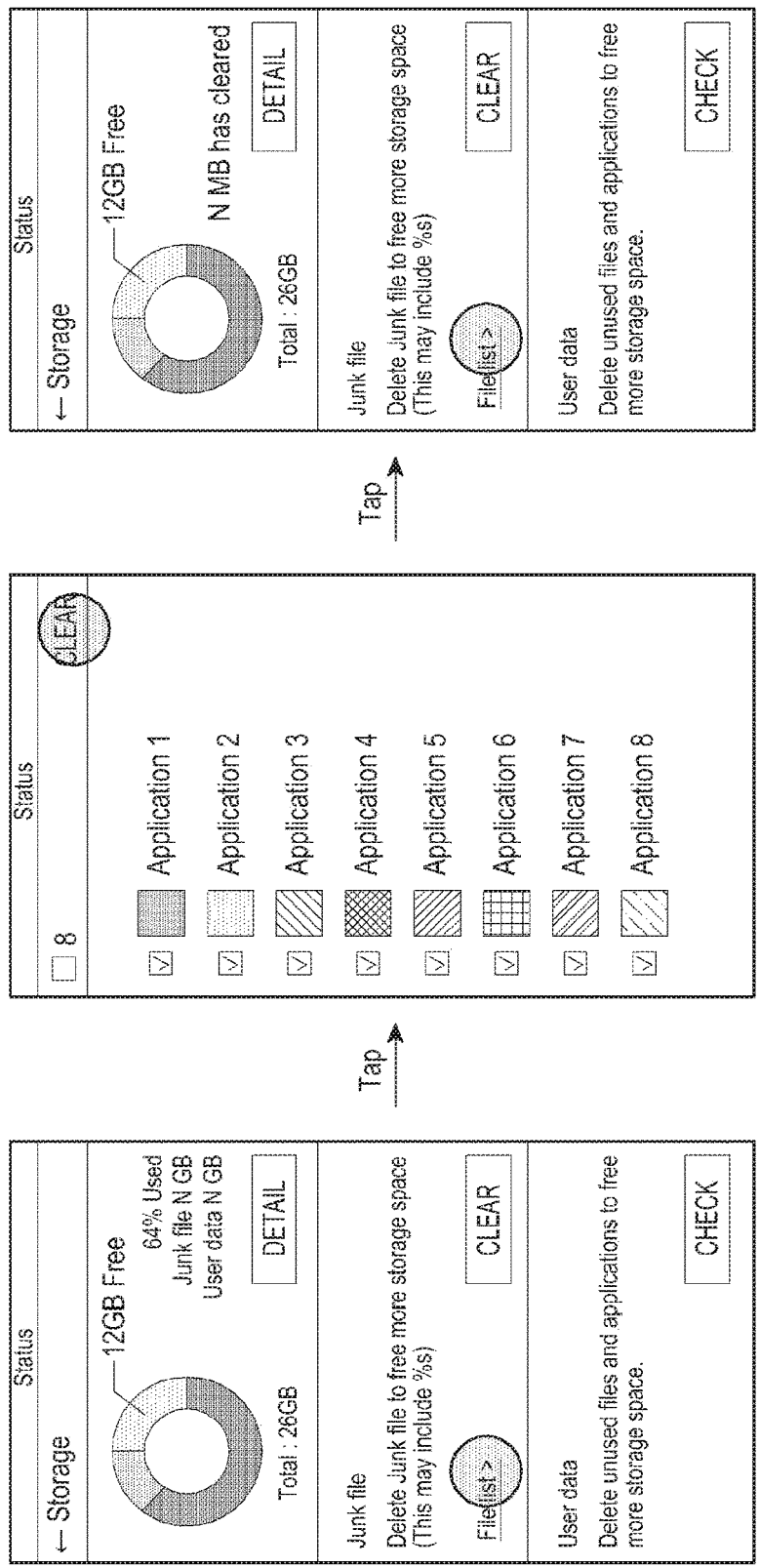

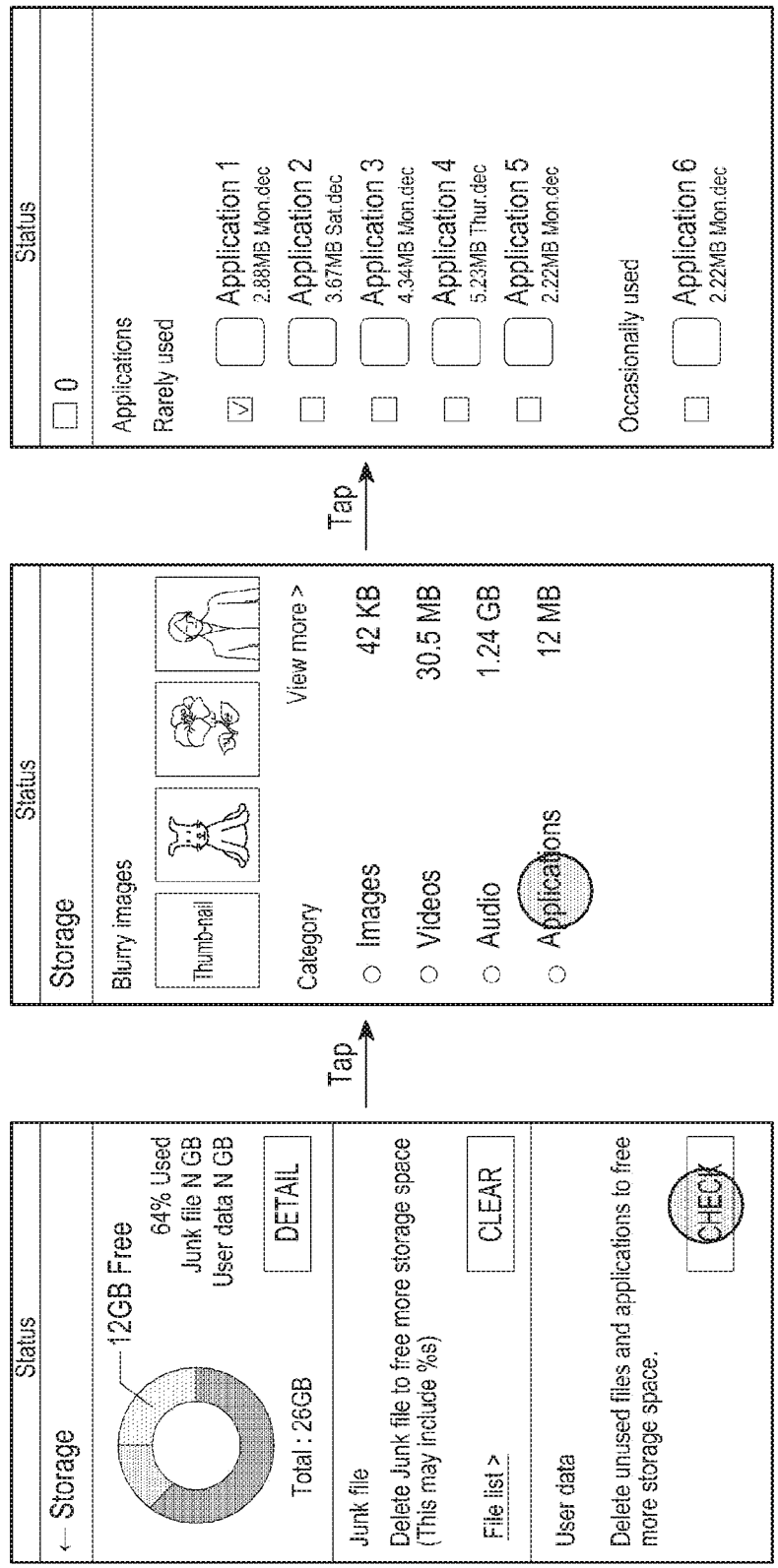

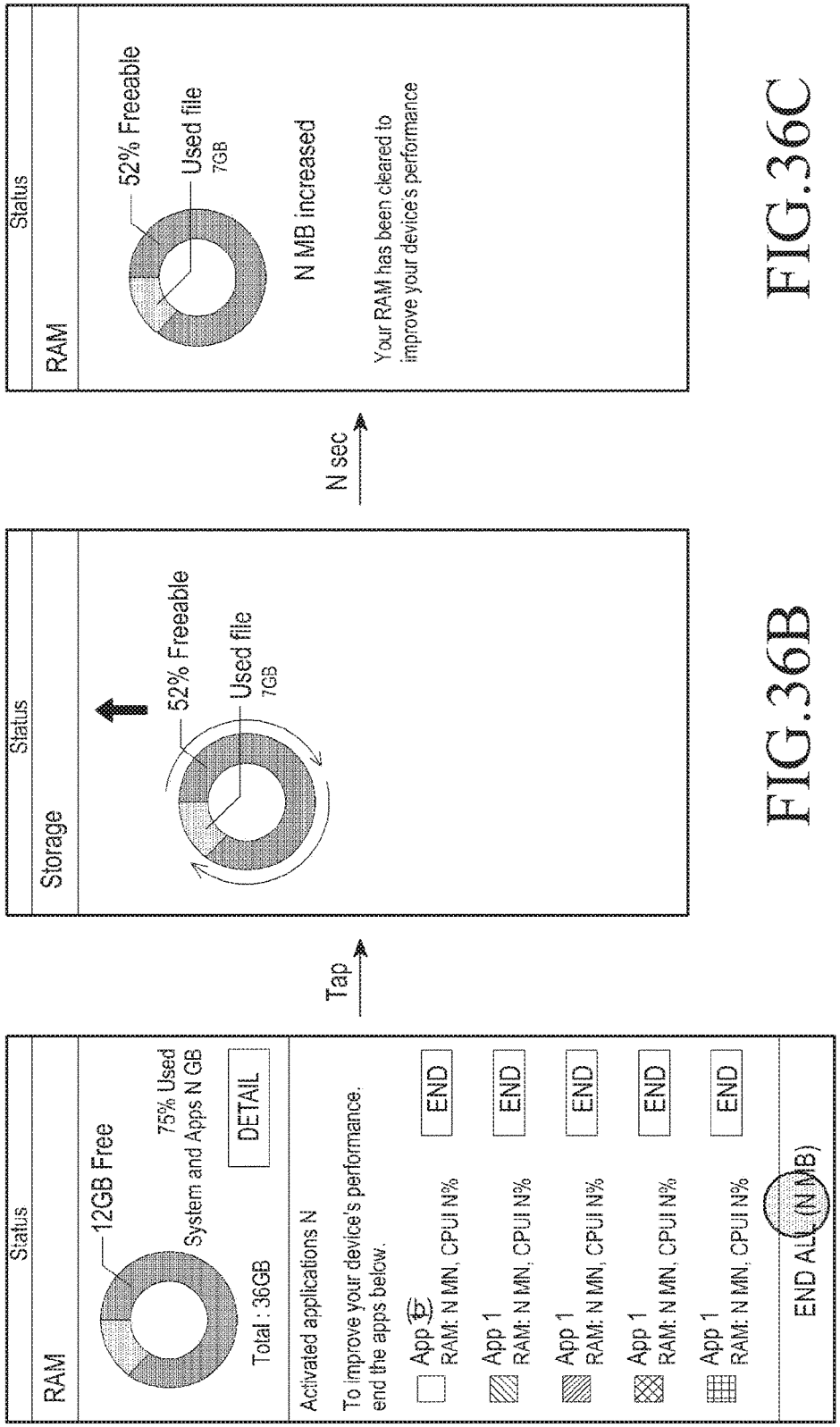

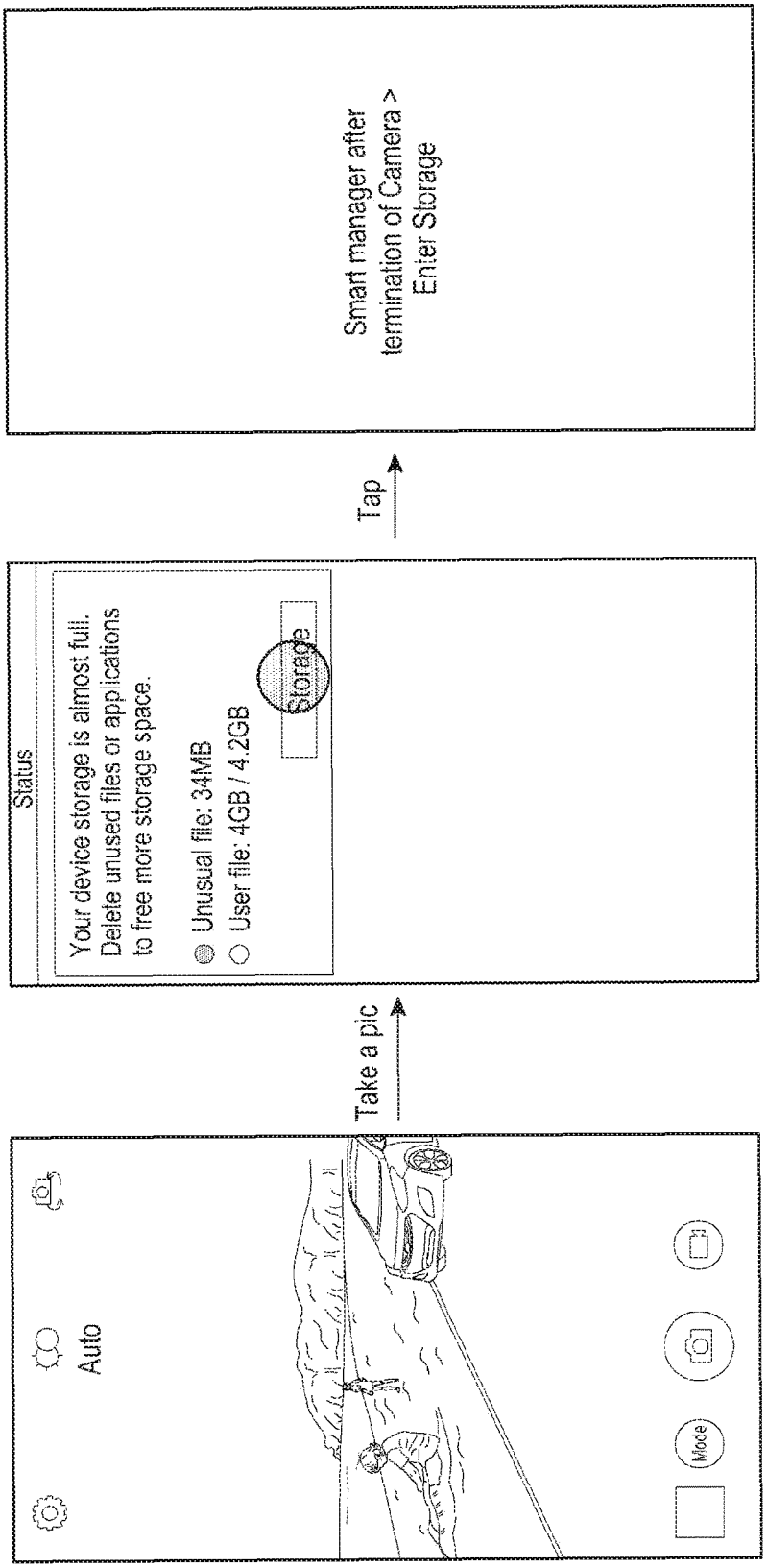

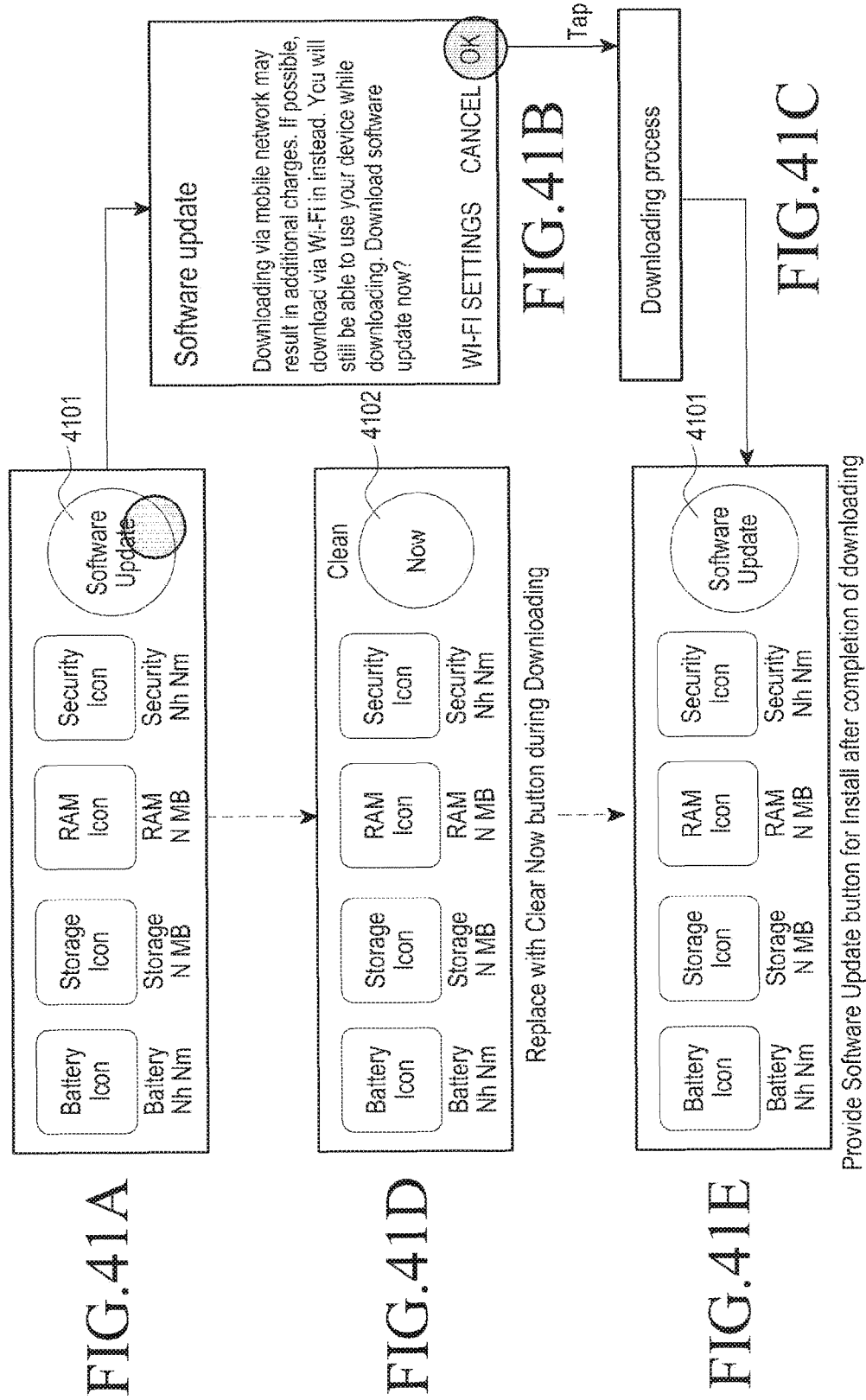

ELECTRONIC DEVICE AND METHOD FOR MANAGING POWER IN ELECTRONIC DEVICE

PRIORITY

This application claims priority under 35 U.S.C. § 119(a) to a Korean Patent Application filed in the Korean Intellectual Property Office on Feb. 26, 2015 and assigned Serial No. 10-2015-0027126, the contents of which are incorporated herein by reference.

BACKGROUND

1. Field of the Disclosure

The present disclosure relates generally to an electronic device, and more particularly, to a method for managing power in the electronic device.

2. Description of the Related Art

Generally, in an application preloaded on an electronic device, such as a smartphone, an error is minimized through several verification stages during manufacturing. However, even if an electronic device is released after being optimized during the manufacturing process, performance degradation or decreases in battery use time may occur due to installation of an unverified application or an error in a running application.

To prevent these instances from occurring, an electronic device provides a battery consumption value by using a battery management application and provides an application termination function.

However, the current information provided by the battery management application can make it difficult for a user to identify a problem or to decide how to perform power management.

Accordingly, there is a need in the art for an improved method of managing power in an electronic device.

SUMMARY

The present disclosure has been made to address the above-mentioned problems and disadvantages, and to provide at least the advantages described below.

Accordingly, an aspect of the present disclosure is to provide an electronic device capable of providing a means for detecting an application that abnormally or unusually consumes current.

Another aspect of the present disclosure is to provide an electronic device capable of directly controlling information about the detected abnormal or unusual current consumption application, and a method for managing power in the electronic device.

According to an aspect of the present disclosure, there is provided an electronic device including a battery, a display, a processor electrically connected with the battery and the display, and a memory which is electrically connected with the processor and stores at least one application, wherein the memory stores instructions which, when executed, cause the processor to monitor power consumption of the at least one application during execution of the at least one application in an off state of the display, and to display, on the display, information indicating whether a value of the power consumption exceeds a threshold selected during a selected time, based on at least a part of a result of the monitoring immediately after the display enters an on state.

According to another aspect of the present disclosure, there is provided a method for managing power in an electronic device, including monitoring power consumption of at least one application during execution of the at least one application in an off state of a display of the electronic device, and displaying, on the display, information indicating whether a value of the power consumption exceeds a threshold selected during a selected time, based on at least a part of a result of the monitoring immediately after the display enters an on state.

BRIEF DESCRIPTION OF THE DRAWINGS

The above and other aspects, features, and advantages of the present disclosure will be more apparent from the following detailed description taken in conjunction with the accompanying drawings, in which:

FIGS. 9A, 9B, 9C, 9D and 9E illustrate displaying of detection information of an abnormal or unusual current consumption application in an electronic device according to embodiments of the present disclosure;

FIGS. 10A, 10B, 10C and 10D illustrate processing of detection information of an abnormal current consumption application in an electronic device according to embodiments of the present disclosure;

FIGS. 14A, 14B and 14C illustrate displaying of a history of an abnormal current consumption application in an electronic device according to embodiments of the present disclosure;

FIGS. 16A and 16B illustrate a screen switchover in a power saving mode of an abnormal current consumption application in an electronic device according to embodiments of the present disclosure;

FIGS. 21, 22A, 22B, 23A, 23B, 24A, 24B, 25A, 25B, 26A, 26B, 26C, 26D, 27A, 27B and 27C illustrate providing of battery information managed by a smart manager of an electronic device according to embodiments of the present disclosure;

FIGS. 28, 29A, 29B, 29C, 30A, 30B, 30C, 31A, 31B, 31C, 31D, 32A, 32B, 32C, 32D, 33A, 33B, 33C, 33D, 34A, 34B and 34C illustrate providing of storage information managed by a smart manager of an electronic device according to embodiments of the present disclosure;

FIGS. 35, 36A, 36B and 36C illustrate providing of random access memory (RAM) information managed by a smart manager of an electronic device according to embodiments of the present disclosure;

FIGS. 37A, 37B, 37C, 38A, 38B, 38C, 39A and 39B illustrate controlling of a storage space of a storage unit managed by a smart manager of an electronic device according to embodiments of the present disclosure; and FIGS. 40, 41A, 41B, 41C, 41D and 41E illustrate providing a smart manager of an electronic device as a widget according to embodiments of the present disclosure.

Throughout the drawings, like reference numerals will be understood to refer to like parts, components, and structures.

DETAILED DESCRIPTION OF EMBODIMENTS OF THE DISCLOSURE

Figure 1:
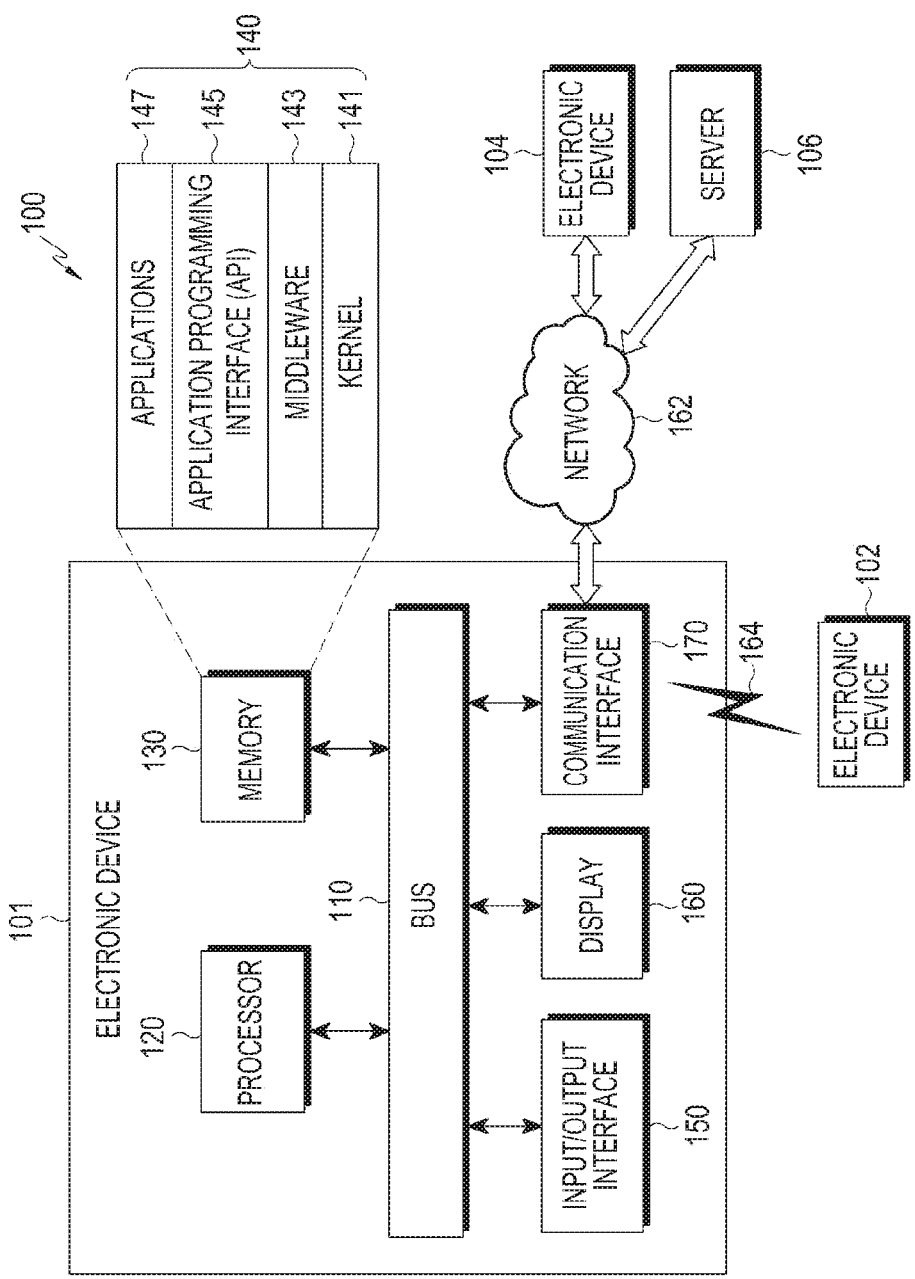
FIG. 1 illustrates a network environment according to embodiments of the present disclosure.

Hereinafter, embodiments of the present disclosure will be disclosed with reference to the accompanying drawings. However, the present disclosure is not intended to be limited to particular embodiments, and thus should be construed as including various modifications, equivalents, and/or alternatives according to the embodiments of the present disclosure. In regard to the description of the drawings, like reference numerals refer to like elements. A detailed description of known functions and/or configurations will be omitted for the sake of clarity and conciseness.

In the present disclosure, expressions such as "having," "may have," "comprising," or "may comprise" indicate existence of a corresponding characteristic and do not exclude the existence of additional characteristics.

In the present disclosure, expressions such as "A or B," "at least one of A or/and B," or "one or more of A or/and B" may include all possible combinations of the listed items. For example, "A or B," "at least one of A and B," or "one or more of A or B" indicates including at least one A, including at least one B, or including both at least one A and at least one B.

Expressions such as "first," "second," "primary," or "secondary," used in various embodiments may represent various elements regardless of order and/or importance and do not limit corresponding elements. The expressions may be used for distinguishing one element from another element. For example, a first user device and a second user device may represent different user devices regardless of order or importance, and a first element may be referred to as a second element, and a second element may be referred to as a first element, without deviating from the scope of the present disclosure.

When it is described that an element, such as a first element, is "operatively or communicatively coupled" to or "connected" to another element, such as a second element, the first element can be directly connected to the second element or can be connected to the second element through a third element. However, when it is described that the first element is "directly connected" or "directly coupled" to the second element, it is indicated that there is no third element between the first and second elements.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may indicate that the apparatus "can" operate together with another apparatus or component. For example, a phrase "a processor configured to perform A, B, and C" may be a generic-purpose processor, such as a central processing unit (CPU) or an application processor, that can perform a corresponding operation by executing at least one software program stored at an exclusive processor for performing a corresponding operation or at a memory device.

Terms defined in the present disclosure are used for only describing a specific embodiment and are not intended to limit the scope of other embodiments. When used in a description of the present disclosure and the appended claims, a singular form may include a plurality of forms unless it is explicitly differently represented. Entire terms including a technical term and a scientific term used in the present disclosure may have the same meaning as one generally understood by a person of common skill in the art. It may be analyzed that terms defined in a dictionary have the same meaning as or a meaning similar to that of a context of related technology and are not analyzed as an ideal or excessively formal meaning unless explicitly defined. In some cases, terms defined in the present disclosure cannot be analyzed to exclude the present embodiments.

An electronic device according to embodiments of the present disclosure may include a communication function. For example, the electronic device may include at least one of a smart phone, a tablet personal computer (PC), a mobile phone, a video phone, an electronic book (e-book) reader, a desktop PC, a laptop PC, a netbook computer, a personal digital assistant (PDA), a portable multimedia player (PMP), a motion pictures experts group layer audio 3 (MP3) player, mobile medical equipment, a camera, and a wearable device. According to embodiments of the present disclosure, the wearable device includes at least one of an accessory type, such as a watch, a ring, a bracelet, an anklet, a necklace, glasses, contact lenses, a head-mounted device (HMD), a clothing-integrated type, such as an electronic cloth, a body-attachable type, such as a skin pad or tattoo, and a body-implantable type, such as an implantable circuit.

According to some embodiments, the electronic device may be a home appliance, such as at least one of a television (TV), a digital video disk (DVD) player, audio equipment, a refrigerator, an air conditioner, a vacuum cleaner, an oven, a microwave oven, a washing machine, an air cleaner, a set-top box, a home automation control panel, a security control panel, a TV box, such as Samsung HomeSync™, Apple TV™, or Google TV™, a game console, such as Xbox™ or PlayStation™, an electronic dictionary, an electronic key, a camcorder, and an electronic frame.

According to another embodiment, the electronic device may include at least one of various medical equipment, such as a blood sugar, heartbeat, blood pressure, or body temperature measurement device, magnetic resonance angiography (MRA), magnetic resonance imaging (MRI), computed tomography (CT), an imaging device, or an ultrasonic device), a navigation system, a global navigation satellite system (GNSS), an event data recorder (EDR), a flight data recorder (FDR), a vehicle infotainment device, electronic equipment for ships, such as navigation system and gyro compass, avionics, a security device, a vehicle head unit, an industrial or home robot, an automated teller machine (ATM), a point of sales (POS) device, and Internet of Things (IoT) devices, such as electric bulbs, various sensors, electricity or gas meters, sprinkler devices, fire alarm devices, thermostats, streetlights, toasters, exercise machines, hot-water tanks, heaters, and boilers.

According to some embodiments, the electronic device may include a part of a furniture or building/structure, an electronic board, an electronic signature receiving device, a projector, and various measuring instruments, such as a water, electricity, gas, or electric wave measuring device. The electronic device according to embodiments of the present disclosure may be one of the above-listed devices or a combination thereof, and may be a flexible device. The electronic device according to embodiments of the present disclosure is not limited to the above-listed devices and may include new electronic devices according to advances in technology.

Herein, the term "user" used in embodiments of the present disclosure may refer to a person who uses the electronic device or a device using the electronic device, such as an artificial intelligence electronic device.

Referring to FIG. 1, a description will be made of an electronic device 101 in a network environment 100 according to embodiments of the present disclosure. The electronic device 101 includes a bus 110, a processor 120, a memory 130, an I/O interface 150, a display module 160, and a communication interface 170. According to some embodiments, the electronic device 101 may omit at least one of the foregoing elements or may further include other elements.

The bus 110 includes a circuit for interconnecting the elements 120 through 170 and for allowing communication between the elements 110 through 170.

The processor 120 includes one or more of a central processing unit (CPU), an application processor (AP), and a communication processor (CP). The processor 120 performs operations or data processing for control and/or communication of at least one other element of the electronic device 101. The processor 120, which may be referred to as a controller, partly or solely includes the controller.

During execution of at least one of the applications in an off state of the display 160, the processor 120 monitors power consumption of the applications. Immediately after the display 160 enters an on state, the processor 120 stores, in the memory 130, at least one instruction for displaying, on the display 160, information about whether a value of the power consumption or a power consumption value exceeds a threshold selected during a selected time based on a result of the monitoring.

The memory 130 includes a volatile and/or nonvolatile memory. The memory 130 stores commands or data associated with at least one other element of the electronic device 101. According to an embodiment of the present disclosure, the memory 130 stores software and/or a program 140. The program 140 includes a kernel 141, middleware 143, an application programming interface (API) 145, and/or applications 147, at least some of which may be referred to as an operating system (OS).

The memory 130 stores at least one application. The memory 130 stores instructions for controlling an application which abnormally or unusually consumes current or power among the at least one application. For example, the memory 130 stores instructions for the following: providing information indicating whether a power consumption value of an application exceeds a threshold selected during a selected time on the display 160 in the form of a popup window; displaying an icon for executing the application on the display 160 and displaying information about whether a power consumption value of the application exceeds a threshold selected during a selected time on or in adjacent to the icon; identifying a category of the application and displaying, on the display 160, information about whether a power consumption value of the application exceeds a power consumption threshold that is preset for the category during a selected time; storing a use frequency of the application and further displaying information about whether the use frequency exceeds a selected use frequency threshold or use history information based on at least a part of the use frequency on the display 160; and providing a user interface (UI) for setting whether to display information about whether a power consumption value of the application exceeds a threshold selected during a selected time on the display 160 or a UI for displaying at least one application being executed or running in the processor 120.

The kernel 141 controls or manages system resources, such as the bus 110, the processor 120, or the memory 130, used to execute an operation or a function implemented in other programs, such as the middleware 143, the API 145, or the applications 147. The kernel 141 provides an interface through which the middleware 143, the API 145, or the applications 147 accesses separate components of the electronic device 101 to control or manage the system resources.

The middleware 143 serves as an intermediary for allowing the API 145 or the applications 147 to exchange data in communication with the kernel 141.

The middleware 143 processes one or more task requests received from the applications 147 according to priorities. For example, the middleware 143 provides priorities for using a system resource of the electronic device 101 to at least one of the applications 147. For example, the middleware 143 performs control, such as scheduling or load balancing, with respect to the one or more task requests by processing the one or more task requests according to the priorities given to the at least one of the applications 147.

The API 145 is used for the applications 147 to control a function provided by the kernel 141 or the middleware 143, and includes at least one interface or function for file, window, image processing or character control.

The I/O interface 150 delivers a command or data input from a user or another external device to other element(s) of the electronic device 101. The I/O interface 150 may also output a command or data received from other element(s) of the electronic device 101 to a user or another external device.

The display module 160 includes, for example, a liquid crystal display (LCD), a light emitting diode (LED) display, an organic LED (OLED) display, a micro-electromechanical System (MEMS) display, or an electronic paper display. The display module 160 displays various contents to users, such as a text, image, video, icon, or symbol, and includes a touch screen which receives a touch, gesture, proximity, or hovering input, by using an electronic pen or a part of a body of a user.

The communication interface 170 arranges communication between the electronic device 101 and an external device. For example, the communication interface 170 may be connected to a network 162 through wireless or wired communication to communicate with the external device.

The wireless communication may use, as a cellular communication protocol, for example, at least one of long term evolution (LTE), LTE-advanced (LTE-A), code division multiple access (CDMA), wideband CDMA (WCDMA), a universal mobile telecommunication system (UMTS), wireless broadband (WiBro), or global system for mobile communications (GSM)). The wireless communication includes, for example, a short-range communication 164 including at least one of wireless fidelity (WiFi), Bluetooth™, near field communication (NFC), and a global navigation satellite system (GNSS) such as a global positioning system (GPS), a global navigation satellite system (Glonass), a Beidou navigation satellite system (Beidou), Galileo, and the European global satellite-based navigation system. Herein, the GPS and the GNSS may be interchangeably used. The wired communication includes at least one of a universal serial bus (USB), a high definition multimedia interface (HDMI), a recommended standard (RS)-2032, and a plain old telephone service (POTS). The network 162 includes at least one of a computer network, such as a local area network (LAN) or a wide area network (WAN), the Internet, and a telephone network.

Each of the first external electronic device 102 and the second external electronic device 104 may be a device of the same type as or a different type than the electronic device 101. According to an embodiment of the present disclosure, the server 106 may include a group of one or more servers. According to embodiments, all or some of operations performed in the electronic device 101 may be performed in another electronic device or a plurality of electronic devices. For example, when the electronic device 101 has to perform a function or a service automatically or upon request, the electronic device 101 may request another device to perform at least some functions associated with the function or the service instead of or in addition to executing the function or the service, and the another electronic device performs the requested function or an additional function and delivers the result to the electronic device 101. The electronic device 101 provides the received result or provides the requested function or service by processing the received result. To this end, for example, cloud computing, distributed computing, or client-server computing may be used.

Figure 2:
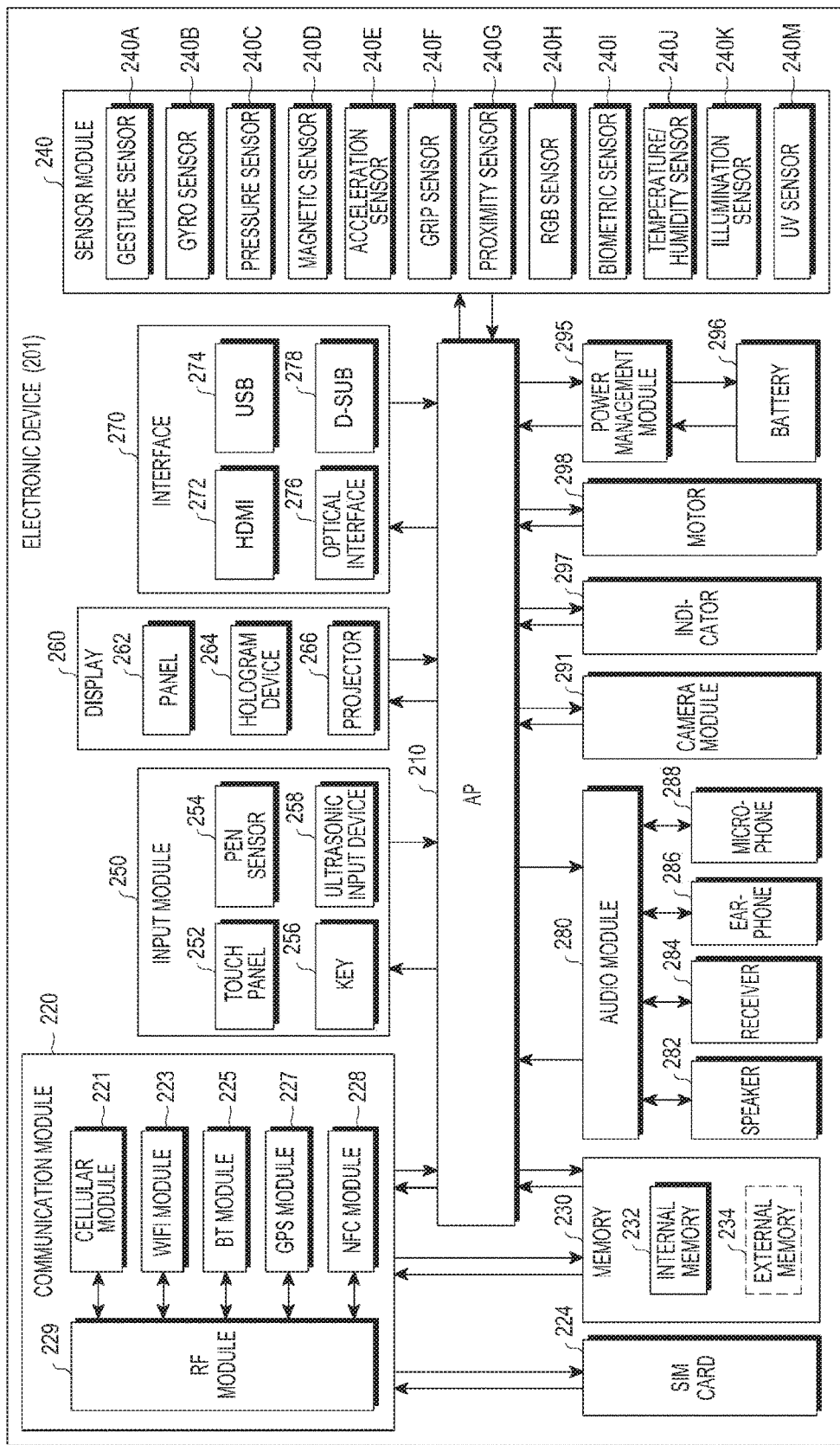
FIG. 2 is a block diagram of an electronic device according to embodiments of the present disclosure.

FIG. 2 is a block diagram of an electronic device 201 according to embodiments of the present disclosure. The electronic device 201 may include the entire electronic device 101 illustrated in FIG. 1 or a part of the electronic device 101 illustrated in FIG. 1. The electronic device 201 includes one or more application processors (APs) 210, a communication module 220, a subscriber identification module (SIM) card 224, a memory 230, a sensor module 240, an input module 250, a display 260, an interface 270, an audio module 280, a camera module 291, a power management module 295, a battery 296, an indicator 297, and a motor 298.

The processor 210 controls multiple hardware or software components connected to the processor 210 by driving an operating system (OS) or an application program, performs processing and operations with respect to various data including multimedia data, and may be implemented with a system on chip (SoC). According to an embodiment, the processor 210 may further include a graphic processing unit (GPU) and/or an image signal processor. The processor 210 includes at least some of the elements illustrated in FIG. 2, such as the cellular module 221. The processor 210 loads a command or data received from at least one of other elements, such as a non-volatile memory, into a volatile memory and processes the command or data and stores various data in the non-volatile memory.

The communication module 220 may have a configuration that is the same as or similar to the communication interface 170 illustrated in FIG. 1. The communication module 220 includes, for example, the cellular module 221, a WiFi module 223, a Bluetooth (BT) module 225, a GNSS module 227, a near field communication (NFC) module 228, and a radio frequency (RF) module 229.

The cellular module 221 provides, for example, a voice call, a video call, a text service, or an Internet service over a communication network. According to an embodiment, the cellular module 201 may identify and authenticate the electronic device 201 in a communication network by using a subscriber identification module (SIM) card 224. The cellular module 221 performs at least one of functions that may be provided by the processor 210, and includes a communication processor (CP).

At least one of the WiFi module 223, the BT module 225, the GPS module 227, and the NFC module 228 includes a processor for processing data transmitted and received by a corresponding module. According to an embodiment, at least two of the cellular module 221, the WiFi module 223, the BT module 225, the GNSS module 227, and the NFC module 228 may be included in one Integrated Chip (IC) or IC package.

The RF module 229 transmits and receives a communication signal, and includes a transceiver, a power amp module (PAM), a frequency filter, a low noise amplifier (LNA), or an antenna. According to another embodiment, at least one of the cellular module 201, the WiFi module 223, the BT module 225, the GNSS module 227, and the NFC module 228 transmits and receives an RF signal through a separate RF module.

The SIM card 224 may be an embedded SIM, and includes unique identification information, such as an integrated circuit card identifier (ICCID) or subscriber information, such as an international mobile subscriber identity (IMSI).

The memory 230 includes an internal memory 232 or an external memory 234. The internal memory 232 includes at least one of a volatile memory, such as dynamic random access memory (DRAM), static RAM (SRAM), and synchronous dynamic RAM (SDRAM), and a non-volatile memory, such as one time programmable read only memory (OTPROM), programmable ROM (PROM), erasable and programmable ROM (EPROM), electrically erasable and programmable ROM (EEPROM), mask ROM, flash ROM, NAND flash memory, or NOR flash memory, and a solid state drive (SSD).

The external memory 234 may further include a flash drive, such as compact flash (CF), secure digital (SD), micro-SD, mini-SD, extreme Digital (xD), a MultiMedia Card (MMC), or a memory stick. The external memory 234 may be functionally and/or physically connected with the electronic device 201 through various interfaces.

The sensor module 240 measures physical quantity or senses an operation state of the electronic device 201 to convert the measured or sensed information into an electric signal. The sensor module 240 includes at least one of a gesture sensor 240A, a gyro sensor 240B, a pressure sensor 240C, a magnetic sensor 240D, an acceleration sensor 240E, a grip sensor 2040F, a proximity sensor 240G, a color sensor 240H, such as a red, green, blue (RGB) sensor, a biometric sensor 240I, a temperature/humidity sensor 240J, an illumination sensor 240K, and a ultraviolet (UV) sensor 240M. Additionally or alternatively, the sensor module 240 includes an e-nose sensor, an electromyography (EMG) sensor, an electroencephalogram (EEG) sensor, an electrocardiogram (ECG) sensor, or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input module 250 includes a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user.

The (digital) pen sensor 254 includes a recognition sheet which is a part of the touch panel 252 or a separate recognition sheet. The key 256 may also include a physical button, an optical key, or a keypad. The ultrasonic input device 258 senses ultrasonic waves generated in an input means through a microphone, such as the microphone 288) and checks data corresponding to the sensed ultrasonic waves.

The display 260 includes a panel 262, a hologram 264, and a projector 266. The panel 262 may have a configuration that is the same as or similar to that of the display 260 of FIG. 1. The panel 262 may be implemented to be flexible, transparent, or wearable, and configured with the touch panel 252 in one module. The hologram 264 shows a stereoscopic image in the air by using interference of light. The projector 266 displays an image onto an external screen through projection of light. The screen may be positioned inside or outside the electronic device 201. According to an embodiment, the display 260 may further include a control circuit for controlling the panel 262, the hologram 264, or the projector 266.

The interface 270 includes a high-definition multimedia interface (HDMI) 272, a universal serial bus (USB) 274, an optical communication 276, or a D-subminiature 278. The interface 270 may be included in the communication interface 170 illustrated in FIG. 1. Additionally or alternatively, the interface 270 includes a mobile high-definition link (MHL) interface, an SD/MMC interface, or an infrared data association (IrDA) interface.

The audio module 280 bi-directionally converts sound and an electric signal. At least one element of the audio module 280 may be included in the I/O interface 145 illustrated in FIG. 1. The audio module 280 processes sound information input or output through the speaker 282, the receiver 284, the earphone 286, or the microphone 288.

The camera module 291 is a device capable of capturing a still image or a moving image, and according to an embodiment, includes one or more image sensors, such as a front or rear sensor, a lens, an image signal processor (ISP), or a flash, such as an LED or a xenon lamp.

The power management module 295 manages power of the electronic device 201. According to an embodiment, the power management module 295 includes a Power management integrated circuit (PMIC), a charger IC, or a battery gauge. The PMIC may have a wired and/or wireless charging scheme. The wireless charging scheme includes a magnetic-resonance, magnetic induction, and an electromagnetic type, and for wireless charging, an additional circuit such as a coil loop, a resonance circuit, or a rectifier may be further included. The battery gauge measures the remaining capacity of the battery 296 or the voltage, current, or temperature of the battery 296 during charging. The battery 296 includes a rechargeable battery and/or a solar battery:

The indicator 297 displays a particular state, for example, a booting state, a message state, or a charging state, of the electronic device 201 or a part thereof, such as the processor 210). The motor 298 converts an electric signal into mechanical vibration or generates vibration or a haptic effect. Although not shown, the electronic device 201 includes a processing device, such as a GPU) for supporting a mobile TV. The processing device for supporting the mobile TV processes media data according to, a standard such as digital multimedia broadcasting (DMB), digital video broadcasting (DVB), or mediaFlo™.

Each of the foregoing elements described herein includes one or more components, and a name of the part may vary with a type of the electronic device 2001. The electronic device according to the present disclosure includes at least one of the foregoing elements, and some of the elements may be omitted therefrom or other elements may be further included therein. As some of the elements of the electronic device according to the present disclosure are coupled into one entity, the same function as those of the elements that have not been coupled may be performed.

Figure 3:
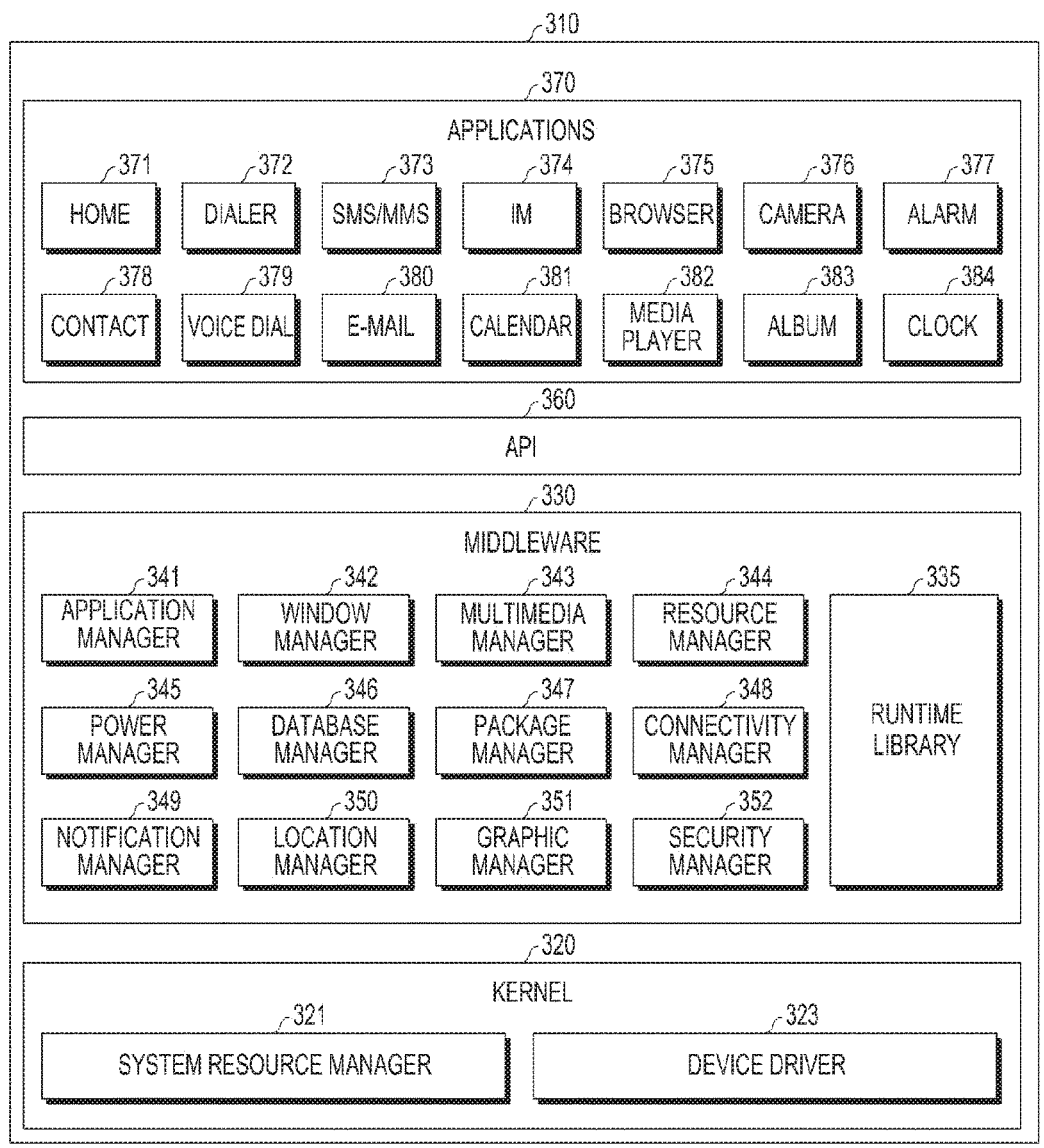
FIG. 3 is a block diagram of a programming module according to embodiments of the present disclosure.

FIG. 3 is a block diagram of a programming module according to embodiments of the present disclosure. According to an embodiment of the present disclosure, the programming module 310 includes an OS for controlling resources associated with an electronic device, such as the electronic device 101 and/or various applications executed on the OS. The OS includes Android, iOS, Windows, Symbian, Tizen, or Bada.

The programming module 310 includes a kernel 320, a middleware 330, an application programming interface (API) 360, and/or applications 370. At least a part of the programming module 310 may be preloaded on an electronic device or may be downloaded from an external electronic device.

The kernel 320 includes a system resource manager 321 and/or a device driver 323. The system resource manager 321 performs control, allocation, or retrieval of system resources. According to an embodiment, the system resource manager 321 includes a process management unit, a memory management unit, or a file system. The device driver 323 includes, for example, a display driver, a camera driver, a BT driver, a shared memory driver, a USB driver, a keypad driver, a WiFi driver, an audio driver, or an inter-process communication (IPC) driver.

The middleware 330 provides functions that the applications 370 commonly requires or provides various functions to the applications 370 through the API 360 to allow the applications 370 to efficiently use a limited system resource in an electronic device. According to an embodiment, the middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 includes a library module that a compiler uses to add a new function through a programming language while the applications 370 are executed. The runtime library 335 performs functions relating to an I/O, memory management, or calculation operation.

The application manager 341 manages a life cycle of at least one application among the applications 370. The window manager 342 manages a GUI resource using a screen. The multimedia manager 343 recognizes a format necessary for playing various media files and performs encoding or decoding on a media file by using a codec appropriate for a corresponding format. The resource manager 344 manages a resource such as source code, memory, or storage space of at least one application among the applications 370.

The power manager 345 manages a battery or power in operation with a basic input/output system (BIOS) and provides power information necessary for the electronic device. The database manager 346 performs a management operation to generate, search or change a database used for at least one application among the applications 370. The package manager 347 manages the installation or update of an application distributed in a package file format.

The connectivity manager 348 manages a wireless connection such as a WiFi or Bluetooth connection. The notification manager 349 displays or notifies events such as arrival messages, appointments, and proximity alerts in a manner that is not disruptive to a user. The location manager 350 manages location information of an electronic device. The graphic manager 351 manages a graphic effect to be provided to a user or a user interface (UI) related thereto. The security manager 352 provides a general security function necessary for system security or user authentication. According to an embodiment of the present disclosure, when an electronic device has a call function, the middleware 330 may further include a telephony manager for managing a voice or video call function of the electronic device.

The middleware 330 includes a middleware module forming a combination of various functions of the above-mentioned internal elements. The middleware 330 provides modules specified according to types of OS so as to provide distinctive functions. Additionally, the middleware 330 may delete some of existing elements or add new elements dynamically.

The API 360 may be provided as a set of API programming functions with a different configuration according to the OS. In the case of Android or iOS, for example, one API set may be provided by each platform, and in the case of Tizen, two or more API sets may be provided.

The applications 370 include one or more applications capable of executing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application, such as for measuring an exercise amount or a blood sugar, or an environment information providing application, such as for providing air pressure, humidity, or temperature information.

According to an embodiment, the applications 370 include an information exchange application supporting information exchange between the electronic device and an external electronic device. The information exchange application includes a notification relay application for transferring specific information to the external electronic device or a device management application for managing the external electronic device.

For example, the notification relay application includes a function for transferring notification information generated in another application, such as an SMS/MMS application, an e-mail application, a health care application, or an environment information application of the electronic device to an external electronic device. The notification relay application may receive notification information from an external electronic device to provide the same to a user.

The device management application manages at least one function of the electronic device or of an external electronic device, and a service provided by an application operating in an external electronic device or provided by the external electronic device.

According to an embodiment, the applications 370 include a health care application of mobile medical equipment) designated according to an attribute of the external electronic device. According to an embodiment, the applications 370 include an application received from the external electronic device, a preloaded application, or a third party application that may be downloaded from the server. Names of elements of the programming module 310 according to the illustrated embodiment may vary depending on a type of an OS.

According to embodiments, at least a part of the programming module 310 may be implemented by software, firmware, hardware, or a combination of at least two of them. The at least a part of the programming module 310 may be implemented or executed by a processor, such as the processor 210. The at least a part of the programming module 310 includes a module, a program, a routine, sets of instructions, or a process for performing one or more functions.

A term "module" used herein may mean, for example, a unit including one of or a combination of two or more of hardware, software, and firmware. The "module" may be interchangeably used with a unit, logic, a logical block, a component, or a circuit. The "module" may be a minimum unit or a portion of an integrated component. The "module" may be a minimum unit or a portion thereof performing one or more functions. The "module" may be implemented mechanically or electronically. For example, the "module" according to the embodiments includes at least one of an application-specific integrated circuit (ASIC) chip, field-programmable gate arrays (FPGAs), and a programmable-logic device performing certain operations already known or to be developed.

At least a part of a device or a method according to embodiments of the present disclosure may be implemented with a command stored in a computer-readable storage medium in the form of a programming module. When the command is executed by a processor, the one or more processors performs a function corresponding to the command. The computer-readable storage medium may be, for example, the memory 130.

The computer readable recording medium includes hard disk, floppy disk, magnetic media, such as magnetic tape, optical media, such as compact disc read only memory (CD-ROM) or digital versatile disc (DVD), magneto-optical media, such as floptical disk, and a hardware device, such as ROM. RAM, or flash memory. Further, the program instructions include a machine language code created by a complier and a high-level language code executable by a computer using an interpreter. The foregoing hardware device may be configured to be operated as at least one software module to perform the present disclosure, or vice versa.

Modules or programming modules according to embodiments of the present disclosure includes one or more of the foregoing elements, have some of the foregoing elements omitted, or further include additional other elements. Operations performed by the modules, the programming modules or other elements may be executed in a sequential, parallel, repetitive or heuristic manner. Also, some of the operations may be executed in different order or omitted, or may have additional different operations. Embodiments disclosed herein are provided to describe and help understanding of disclosed technical matters, and are not intended to limit the scope of technology described herein. Thus, the scope of the present invention should be construed as including any change or various other embodiments based on the technical spirit of the present document.

Figure 4:
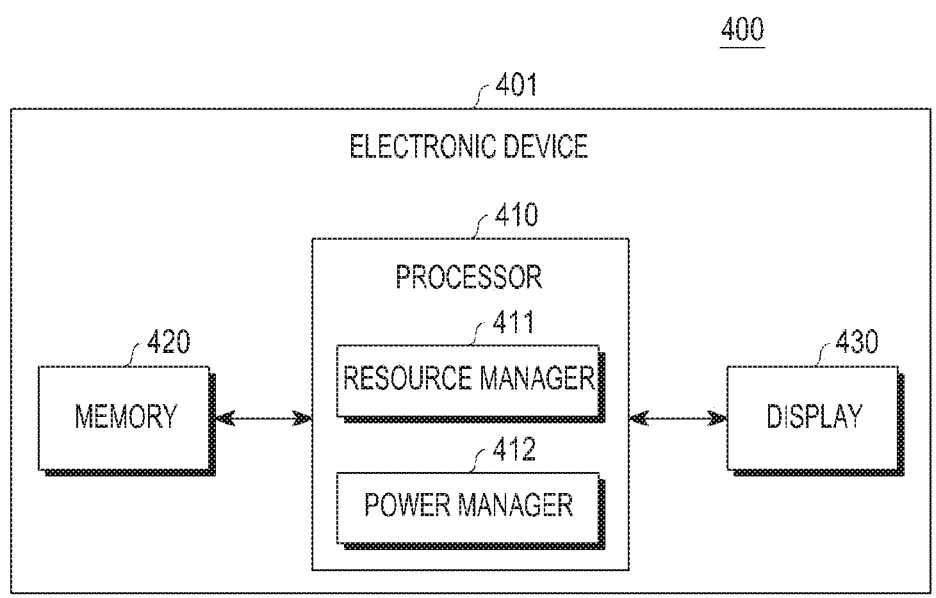
FIG. 4 is a block diagram of an electronic device according to embodiments of the present disclosure.

FIG. 4 is a block diagram 400 of an electronic device 401 according to embodiments of the present disclosure. Referring to FIG. 4, the electronic device 401 includes a processor 410, a memory 420, and a display 440.

According to embodiments, the processor 410 may be the processor 120 illustrated in FIG. 1. The processor 410 includes at least one of hardware, software, and firmware.

According to embodiments, the processor 410 detects an application that abnormally consumes current or power among at least one application running in the electronic device 401.

According to an embodiment, the processor 411 collects information including at least one of first information about a category of an application, second information about a use frequency of the application, and third information about a state and a consumption current of at least one running application, and detects an application that abnormally consumes power among the at least one running application based on the collected information.

According to an embodiment, for the first information about the category of the application, the processor 411 determines a category of an application installed in the electronic device 401 and stores the determined category in a category database (DB) of the memory 420.

The determination of the category of the application may be performed at the time of downloading the application, installing the application, initializing application data, or executing the application or at the request of a user.

If category information is included in installation information of the application, the processor 410 detects the category of the application from the installation information. The processor 410 detects the category of the application from a server or an external electronic device. The server may be a server providing the application. The category of the application may also be detected using an application category DB in the electronic device 410.

According to an embodiment, for the second information about the use frequency of the application, the processor 410 monitors whether an application is used and records a result of the monitoring in a use frequency DB. The processor 410 periodically investigates a use frequency of the application and records the use frequency in the use frequency DB.

For example, the processor 410 may monitor a use frequency of an application or an application use frequency during a preset period or continuously immediately after installation of the application and record the use frequency in the use frequency DB.

The application use frequency includes the number of times a user executes the application. The application use frequency may further include user input information regarding the application.

The processor 410 receives the application use frequency from an external electronic device.

The processor 410 determines that the application has not been used, if the use frequency of the application is lower than a preset threshold based on the use frequency DB.

According to an embodiment, for the third information, the processor 410 detects a state and a consumption current of at least one running application.

The processor 410 includes a resource manager 411 and a power manager 412.

The resource manager 411 collects state information of an application running in the electronic device 401, a type of a resource used by the application, and state information of the resource, periodically or upon generation of an event signal, such as a wake-up signal, a timer, or a battery reduction signal, according to a monitoring policy, and the power manager 412 collects battery use information of the electronic device 401.

The processor 410 obtains the application state information of the application running in the electronic device 401, the resource type information of the resource used by the application, and the resource state information of the resource from the resource manager 411, and obtains the battery use information of the electronic device 401 from the power manager 412. The processor 410 detects a state and a consumption current of the application by calculating a consumption current of a CPU due to application code execution and a consumption current of the resource used by the application based on the information obtained as described above. Herein, separation of the processor 410, the resource manager 411, and the power manager 412 is an example, and may be implemented in various forms.

Figure 5:
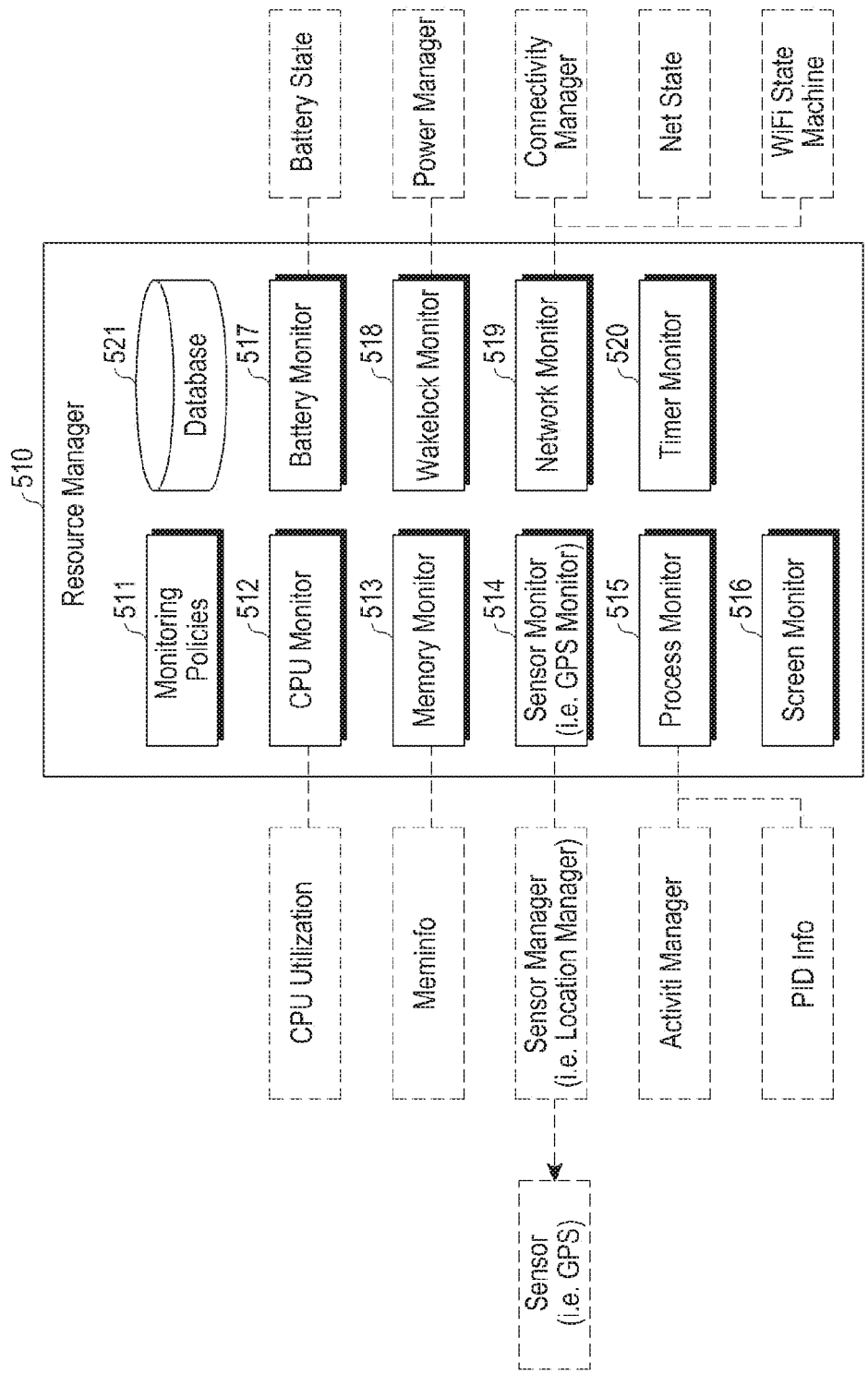
FIG. 5 is a structural diagram of a resource manager of an electronic device according to embodiments of the present disclosure.

FIG. 5 is a structural diagram of a resource manager 510 of an electronic device according to embodiments of the present disclosure. The resource manager 510, which is a detailed depiction of the resource manager 411 in FIG. 4 which will be further described in relation to FIG. 5, monitors a CPU, battery, memory, wakelock, sensor, network, processor, timer, and a display. These monitored items are merely examples and may be variously changed depending on the electronic device.

As shown in FIG. 5, the resource manager 510 includes a monitoring policy unit 511 having monitor period information stored therein, a CPU monitor 512 monitoring a CPU occupancy rate, a memory monitor 513 monitoring a state of the memory, a sensor monitor 514 monitoring at least one sensor included in the electronic device 401, a process monitor 515 monitoring a type of a running application, and a display monitor 516 monitoring a state of a display 430. The resource manager 510 includes a battery monitor 517 monitoring a battery state of the electronic device 401, a wakelock monitor 518 monitoring a wakelock for maintaining a particular power state, a network monitor 519 monitoring a network state of the electronic device 401, and a timer monitor 520 monitoring a timer causing an event according to a time period.

The resource manager 510 includes a DB 521, monitors a state of at least one running application and of at least one resource being used by the application in the elements 512 through 520 of the resource manager 510, and stores the monitored states in the DB 521.

For example, the processor 410 stores a foreground or background execution state of at least one running application as a state of the applications in a DB 521 based on a result of the monitoring by the resource manager 411 (the resource manager 510 of FIG. 5). The processor 410 stores a running, pause, stop, or killed state of the application as a state of the application in the DB 521. The application state is merely an example, and may have various changes.

The resource manager 510 stores an on or off state of a resource, such as a CPU, a wakelock, a mobile network, WiFi, or GPS, as a state of the resource based on the monitoring result in the DB 521. The processor 410 stores a unique state specific for a resource as a state of the resource. For example, the processor 410 stores an on, off, or brightness state of a display as a state of a resource, and stores a scan, on, or data traffic state as a state of a resource for WiFi.

The processor 410 obtains a monitoring result of the resource manager 510 and battery use information collected by the power manager 412, and detects a state and a consumption current of an application by using the monitoring result and the battery use information.

The processor 412 detects a consumption current A of the application by using Equation (1) as follows:

Application Consumption Current $A$=CPU Consumption Current $B$ of Application+Resource Consumption Current $C$ consumed by Resource Used by Application     (1)

The processor 410 detects the CPU consumption current B of the application by using Equation (2) as follows:

CPU Consumption Current $B$ of Application=CPU Occupancy Time of Application+CPU Consumption Current     (2)

The processor 410 detects the resource consumption current C consumed by other resources used by the application using Equation (3) as follows:

Resource Consumption Current $C$ consumed by Resource Used by Application=Resource Use Time or Resource Use Amount $C1$ of Application*Reference Consumption Current $C2$ Specific for Resource Used by Application     (3)

The processor 410 detects the resource use time or the resource use amount C1 of the application by using a resource use history storing unit specific for the application.

Figure 6:
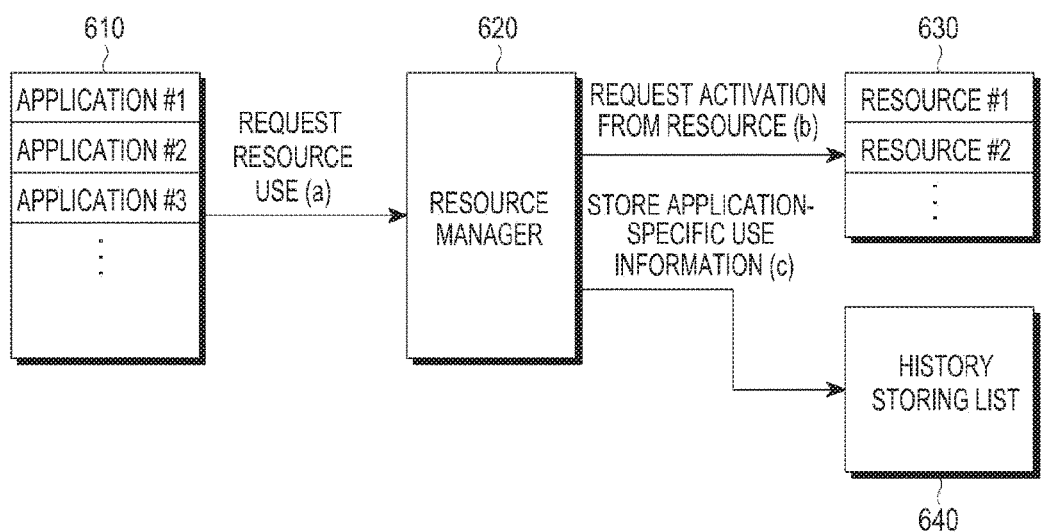
FIG. 6 is a structural diagram for describing a resource use history storing unit in an electronic device according to embodiments of the present disclosure.

FIG. 6 is a structural diagram for describing a resource use history storing unit in an electronic device according to embodiments of the present disclosure.

As illustrated in FIG. 6, if at least one running application among a plurality of applications 610 requests use of a resource from a resource manager 620 as indicated by (a), the resource manager 620 requests activation from that resource among a plurality of resources 630 as indicated by (b). Depending on a resource, the resource may be directly activated by the resource manager 620. The activation may be referred to as a process of allowing an application requesting the resource to use the resource.

The resource manager 620 stores resource use information of the application in a resource use history storing unit 640 as indicated by (c). The resource manager 620 stores time information indicating a resource use time or use amount information indicating a resource use amount in the resource use history storing unit 640.

The processor 410 uses a reference consumption current C2 measured and determined in advance for each resource to detect the resource consumption current C for each resource used by the application. Generally, manufacturers measure a current consumed by each resource of an application based on testing and provide a file recording the measured current as a constant in an electronic device. Thus, by using this file, a resource consumption current for each resource of an application may be calculated. For example, in an Android system, a file "power_profile.xml" may be provided.

The processor 410 detects the resource consumption current C for each resource of an application as follows:

Application's CPU Consumption Current $$\sum_{step=1}^{totalstep} \frac{\text{CPU count in step}}{\text{total CPU count}} \times Code$$

$$\text{launch time in process} \times PowerInCPUStep$$

Total CPU count: a Total CPU use amount
CPU count in step: a CPU use amount specific for a speed
Code launch time in process: a time during which an application is running
PowerinCPUStep: a reference consumption current specific for a speed of a CPU Application Wakelock Consumption Current wakeclockTime×cpu.awake wakelockTime: a wakelock time used by an application
cpu.awake: a wakelock reference consumption current Application's WiFi Consumption Current $$WiFiRxBytes \times WiFiTxBytes \times \frac{WiFiactive \text{ Per Second}}{WiFiBytePerSecond}$$

(WiFiRxBytes+WiFiTxBytes): the amount of transmission/reception data used by an application $$\frac{WiFiactive \text{ Per Second}}{WiFiBytePerSecond}:$$

a reference consumption current per WiFi byte

The WiFi consumption current may be detected by further calculating a current consumed in a WiFi scan or on state in addition to a consumption current based on the amount of transmission/reception data.

Application's Mobile Network Consumption Current $$RadioRxBytes \times RadioTxBytes \times \frac{\text{Radio active Per Second}}{MobileBytePerSecond}$$

RadioRxBytes×RadioTxBytes: the amount of transmission/reception data used by an application $$\frac{\text{Radio active Per Second}}{MobileBytePerSecond}:$$

a reference consumption current per mobile network byte

<Application's GPS Consumption Current>

GpsTime×gpsPower

GpsTime: a GPS time used by an application
gpsPower: a GPS reference consumption current The processor 410 calculates Equation (1) for a running application at preset intervals or according to occurrence of an event, and stores a calculation result in the DB 521.

The reference consumption current used to detect a resource consumption current for each resource used by a running application differs or may differ with a manufacturing state, a use condition, and a use period of the electronic device. In a conventional case, there is no consideration of an individual electronic device or update of the reference consumption current during the use of the electronic device.

According to embodiments, the processor 410 monitors a resource consumption current and updates a reference consumption current with the monitored resource consumption current.

Figure 7:
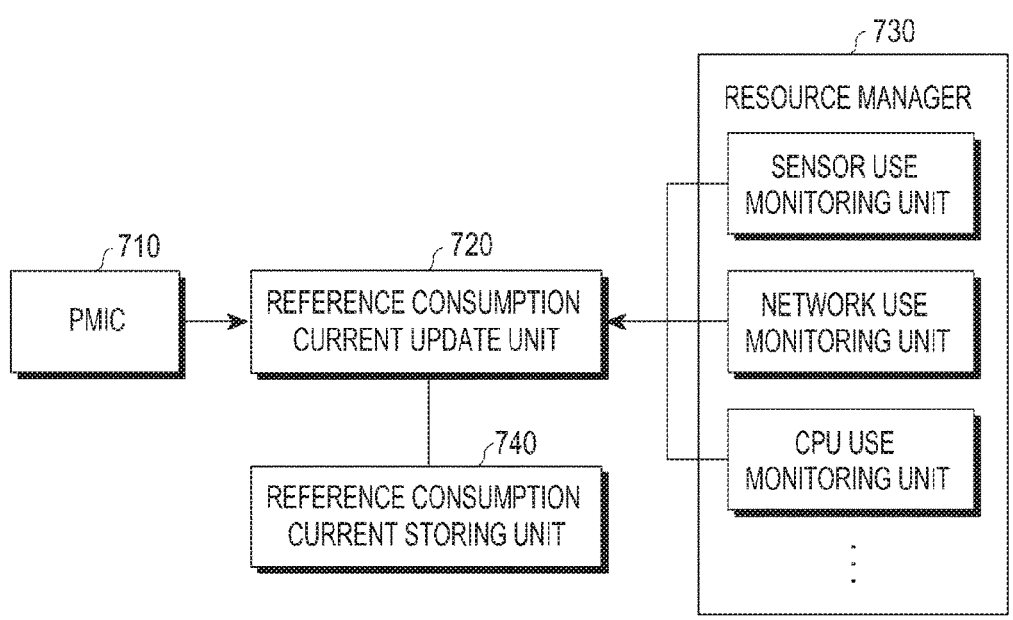
FIG. 7 is a structural diagram for updating a reference current consumption value in an electronic device according to embodiments of the present disclosure.

FIG. 7 is a structural diagram for updating a reference current consumption value in an electronic device according to embodiments of the present disclosure.

As illustrated in FIG. 7, a power management integrated circuit (PMIC) 710 senses a consumption current of the electronic device 401 and transmits the sensed consumption current to a reference consumption current update unit 720. A resource manager 730 sends a signal indicating use of a resource to the reference consumption current update unit 720 when the resource is used.

The reference consumption current update unit 720 determines use of the resource based on the signal received from the resource manager 730, receives a resource consumption current from the PMIC 710, and updates the reference consumption current for the resource with the received resource consumption current in a reference consumption current storing unit 740. A conversion process may be performed to store the consumption current received from the PMIC 710 as the reference consumption current. Herein, the PMIC 710, reference consumption current update unit 720, resource manager 730, and reference consumption current storing unit 740 are separate as an example, and may be implemented in various forms.

According to an embodiment, the processor 410 detects at least one of the at least one running application, which satisfies predetermined conditions, as the abnormal or unusual current consumption application, based on the collected information such as first information about a category of an application, second information about a use frequency of the application, and third information about a state and a consumption current of the application and a resource used by the application.

The processor 410 detects an application that abnormally consumes current in the electronic device 401. The abnormal power consumption corresponds to when the application consumes current regardless of a user's input or setting or when the application consumes current over a preset threshold current value in a defined condition.

For example, for a music playback application, if a wakelock state is maintained for a long time (For example, about 1 hour) or current is consumed by music playback during an off state of a display, this state may be determined as normal current consumption, and for a location tracking application, high current consumption due to frequent updating of a GPS location for a high location accuracy may be determined as normal current consumption. However, if an application having no interaction with a user or an application determined as an unused application having a use frequency lower than a predetermined reference consumes current in the off state of the display, this current consumption may be determined as abnormal, even if low.

For example, when the music playback application maintains the wakelock state for a long time without playing music or when a memo application operates in the off state of the display or as a background, a consumption current is periodically detected, such that if the detected consumption current is similar to a consumption current when the application operates as a foreground, then this current consumption may be determined as abnormal current consumption. For example, if an application using a camera operates in a power saving mode without turning off the camera even after using the camera, such power consumption may be determined as abnormal power consumption.

To detect the abnormal power consumption application, the processor 410 detects an application corresponding to at least one of the following conditions among at least one running application as the abnormal power consumption application, based on the collected information.

(1) if an application consumes current over a preset threshold current value for a preset time;

(2) if a resource used by an application consumes current over a preset threshold current value;

(3) if a resource used by an application consumes current for a preset threshold time or longer;

(4) if an application enters an inactive state without releasing a resource after using the resource;

(5) if an application having a use frequency lower than a preset threshold value consumes current over a preset threshold current value;

(6) if an application consumes current over a threshold current value that is preset for each category of the application; and (7) if an application has an abnormal current consumption history or is included in an abnormal current consumption application list.

According to an embodiment, the processor 410 performs detection in a preset condition, such as a time, a resource, or an application, to reduce a load on the electronic device 401 due to detection of the abnormal current consumption application.

For example, the processor 410 detects an abnormal current consumption application when the display is in the off state, and displays a detection result when the display enters the on state. The processor 410 may also detect the abnormal current consumption application when the display is in the off state during at least a predetermined time. The detection includes automatically controlling the detected abnormal current consumption application, such as termination, pause, deletion, restriction of some functions or use of some resources, or setting to the power saving mode. The automatic control may further include activating the application according to user's setting, or displaying an indication of a detection or automatic control result on or in adjacent to an icon, an execution screen, a name, or a symbol corresponding to the current consumption application.

If there is no user input for at least a predetermined time, or during a time corresponding to a use frequency based on a use frequency DB, the processor 410 detects the abnormal current consumption application. To this end, the processor 410 may calculate a time-specific use frequency. A use frequency threshold may be set based on a fixed value or rate.

The processor 410 detects whether an application corresponding to a selected application category abnormally consumes current.

The processor 410 determines whether to detect an abnormal current consumption application according to a result of comparison between a preset remaining battery capacity with a current remaining battery capacity.

If detecting an abnormal current consumption application among the at least one running application, the processor 410 stores the detected abnormal current consumption application in the memory 420.

The processor 410 displays detection information of the abnormal current consumption application in the display 430 by using the abnormal current consumption application stored in the memory 420.

If a history view of the abnormal current consumption application is selected, the processor 410 displays a history of the abnormal current consumption application, which corresponds to a selected period, such as a weekly, monthly, current, or user setting history, in the order of time, detection frequency, or name, by using the abnormal current consumption application stored in the memory 420.

While displaying the history of the abnormal current consumption application, the processor 410 distinguishably displays at least one icon corresponding to at least one of applications which are detected as the abnormal current consumption applications at high detection frequencies. For example, the icon may be separately displayed using a size, a color, or an indication of the icon.

While displaying a history of the abnormal current consumption application, the processor 410 displays, on a separate region, at least one icon respectively corresponding to at least one of applications which are detected as the abnormal current consumption application at high detection frequencies.

The processor 410 stores detection information, such as information associated with an application such as an icon, a name, a category, or a use frequency of the application, and information associated with detection such as a detection time, position, or reason, or a control function with respect to a detected application, of the abnormal current consumption application in a DB of the memory 420 to display the history of the abnormal current consumption application.

The processor 410 generates a DB with the history of the abnormal current consumption application, such that the user may identify an abnormal current consumption application through a UI even after the power of the electronic device 401 is reset or an indication of detection of the abnormal current consumption application disappears. For example, if the power of an electronic device is turned off because a battery is discharged due to an abnormal current consumption application, the abnormal current consumption application is notified to the user when the power of the electronic device is turned on.

If an uninstalled, paused, or terminated application is reinstalled or resumed, the processor 410 determines whether an abnormal current consumption detection history exists for that application. If such a history exists, the history is provided to the user or function restriction set in abnormal current consumption application detection is activated.

According to embodiments, once an abnormal current consumption application is detected from among at least one running application, the processor 410 displays detection information of the abnormal current consumption application on the display 430.

The processor 410 displays a popup message including the detection information of the abnormal current consumption application on at least one of an idle, lock, and execution screen of a particular application. The popup message is an example, and the detection information of the abnormal current consumption application may also be displayed using at least some regions of the display 430.

The processor 410 displays the detection information of the abnormal current consumption application using a notification panel.

The processor 410 displays the abnormal current consumption application by using an icon or name indicating the application.

For example, with an icon indicating an application, color, chroma, or brightness of the icon is changed according to a detection time of an abnormal current consumption application or a degree of current consumption, an indication of the abnormal current consumption application may be displayed on or in adjacent to the icon. The icon indicating the application is capable of executing the application.

With a name of an application, the abnormal current consumption application may be indicated in various forms such as color, size, or tilt angle of a font, or underline, for example.

The abnormal current consumption application may be indicated with the icon of the application or the name of the application at the time of detection or after execution of the control function, which may be different from each other.

Upon detection of at least one abnormal current consumption applications, the processor 410 displays detection information including at least one of a type of abnormal current consumption application, detection details of abnormal current consumption, and a control function with respect to the abnormal current consumption application.

The type of the abnormal current consumption application includes at least one of icon, name, category, and use frequency of the application.

If the type of the abnormal current consumption application is selected, the processor 410 displays detailed information regarding the selected application, such as at least one of a power consumption amount, a power consumption rate, a CPU occupancy rate, a RAM use amount, a display state, and an execution state of the application. The displaying may be performed on a set-time basis. The time may be set to be a fixed or user-set time range.

The detection details of the abnormal current consumption indicate a reason why or a situation where the abnormal current consumption application is generated. For example, a phrase such as "Volume of Communication with External Source Sharply Increases During Non-Use", "CPU Occupancy Rate Sharply Increases in Sleep State", "Application is Stopped Without Turning off Camera during Web Surfing", or "Current Consumption by Unused Application is Detected in Screen-On State", may be displayed as the detection details of the abnormal current consumption.

The control function with respect to the abnormal current consumption application indicates a means for dealing with the abnormal current consumption application. For example, the control function may include at least one of continuation, termination, uninstallation, pause, and function restriction of the application, (stepwise) power saving mode setting, view of the detailed information, transmission of the detection information to an external electronic device, and view of a result of processing by the external electronic device.

The function restriction or power saving mode of the application includes at least one of screen display change, such as a black-and-white mode, color adjustment, display of only some details, use of only some regions of the screen, or screen update rate adjustment, background operation restriction, priority adjustment, such as CPU occupancy rate restriction, running or execution time restriction, or lowering of scheduling priority, sensor use restriction, wakelock use restriction, termination or pause when the display is turned off, and termination or pause when the electronic device enters the lock screen state.

The control function with respect to the abnormal current consumption application includes a UI for setting whether to activate notification of abnormal current consumption or whether to activate notification of abnormal current consumption for a selected application.

A memory 420 stores an abnormal current consumption application detected among at least one running application, and the display 430 displays information about an abnormal current consumption application among the at least one running application.

The following are aspects according to embodiments of the present disclosure, as previously described.

An electronic device includes a battery, a display, the processor 410 electrically connected with the battery and the display, the memory 420 which is electrically connected with the processor 410 and stores at least one of applications, in which the memory 420 stores instructions, when executed, for causing the processor 410 to monitor power consumption of the at least one application during execution of the at least one application in an off state of the display and to display information indicating whether a value of the power consumption exceeds a threshold selected during a selected time on the display based on at least a part of a result of the monitoring immediately after the display enters an on state.

The instructions enable the processor 410 to provide the information about whether the value of the power consumption exceeds the threshold selected during the selected time on the display by using a popup window.

The popup window provides a user interface (UI) for selecting continuation of execution, termination, pause, uninstallation, and/or function restriction of the applications, and displays a result of performing these functions.

The instructions enable the processor 410 to display an icon capable of executing the applications on the display and to display the information about whether the value of the power consumption exceeds the threshold selected during the selected time on or in adjacent to the icon.

The instructions enable the processor 410 to identify a category of the applications and to display, on the display, information about whether the value of the power consumption exceeds a threshold that is preset for the category during the selected time.

The instructions enable the processor 410 to store a use frequency of the applications and to display information about whether the use frequency exceeds a selected use frequency threshold or use history information based on at least a part of the use frequency on the display.

The instructions enable the processor 410 to provide a UI for setting whether to display the information about whether the value of the power consumption exceeds the threshold selected during the selected time on the display or a UI for displaying at least one applications running in the processor.

The instructions enable the processor 410 to display at least one applications corresponding to the value of the power consumption exceeding the threshold selected during the selected time or to provide a UI capable of displaying the at least one applications.

The applications corresponding to the value of the power consumption exceeding the threshold selected during the selected time may be displayed differently according to state and occurrence frequency of a resource.

Figure 8:
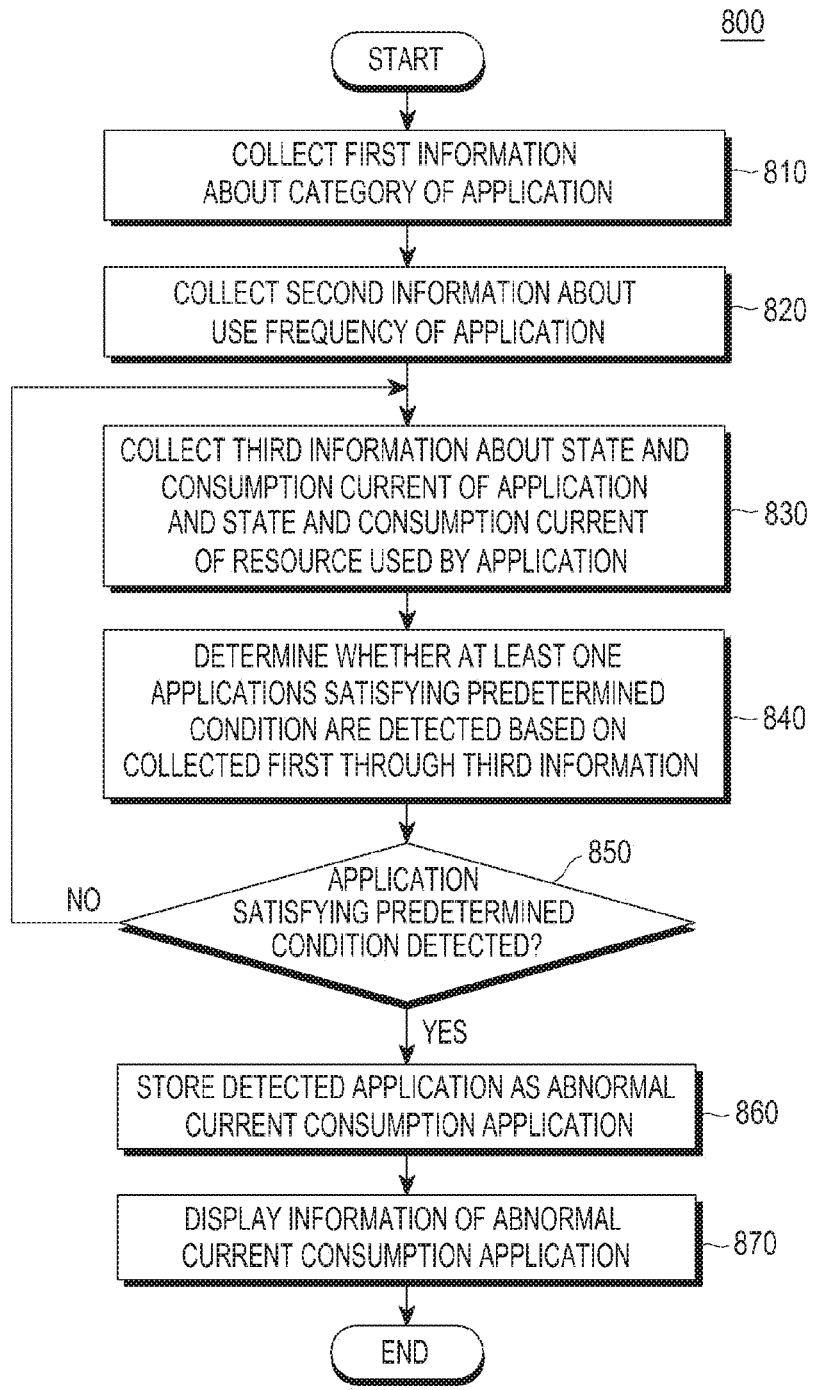
FIG. 8 illustrates a method for managing power in an electronic device according to embodiments of the present disclosure.

FIG. 8 illustrates a method for managing power in an electronic device according to embodiments of the present disclosure.

Referring to FIG. 8, in step 810, for at least one application executable in the electronic device 401, the processor 410 collects first information about a category of the application by using application-specific category information of the electronic device 401 or an external electronic device. The collection of the category of the application may be performed separately from execution of the application.

In step 820, the processor 410 collects second information about a use frequency of an application based on the number of times the application is executed, which is stored in the electronic device 401. The number of times the application is executed may be received from other electronic devices. For example, the use frequency of the application may be transmitted and received among devices connected to the same user account.

In step 830, the processor 410 collects third information about a state and a consumption current of the at least one running application and a state and a consumption current of at least one resources used by the at least one running application.

In step 840, the processor 410 determines whether at least one application satisfying a predetermined condition is detected among the at least one running application, based on the collected first, second and third information.

If it is determined that at least one application satisfying the predetermined condition is detected among the at least one running application in step 850, the processor 410 stores detection information of the detected at least one abnormal current consumption application in the memory 420 in step 860. Step 850 may be performed periodically during execution of the application or upon occurrence of an event.

In step 870, the processor 410 displays the detection information of the detected abnormal current consumption application on the display 420, such as a type of the abnormal current consumption application, detection details of the abnormal current consumption, or a control function with respect to the abnormal current consumption application.

Operations with respect to information about the detected abnormal current consumption application in step 870 will be described in detail with reference to FIGS. 10A-10D, 11A-11D, 12A-12B, 13, 14A-14C, 15, 16A-16B, and 17.

The following are aspects according to embodiments of the present disclosure, as previously described.

A method for managing power in an electronic device includes monitoring power consumption of at least one application during execution of the at least one application in an off state of a display of the electronic device and displaying information indicating whether a value of the power consumption exceeds a threshold selected during a selected time on the display based on at least a part of a result of the monitoring immediately after the display enters an on state.

The method further includes providing the information about whether the value of the power consumption exceeds the threshold selected during the selected time on the display by using a popup window.

The popup window provides a UI for selecting continuation of execution, termination, pause, uninstallation, and/or function restriction of the at least one application.

The popup window displays a result of performing continuation of execution, termination, pause of execution, uninstallation, and/or function restriction with respect to the applications.

The method further includes displaying an icon capable of executing the applications on the display and displaying the information about whether the value of the power consumption exceeds the threshold selected during the selected time on or in adjacent to the icon.

The method further includes identifying a category of the applications and displaying, on the display, information about whether the value of the power consumption exceeds a threshold that is preset for the category during the selected time.

The method further includes storing a use frequency of the applications and displaying information about whether the use frequency exceeds a selected use frequency threshold or use history information based on at least a part of the use frequency on the display.

The method further includes providing a UI for setting whether to display the information about whether the value of the power consumption exceeds the threshold selected during the selected time on the display or a UI for displaying at least one applications running in the processor.

The method further includes displaying at least one applications corresponding to the value of the power consumption exceeding the threshold selected during the selected time or providing a UI capable of displaying the at least one applications.

The applications corresponding to the value of the power consumption exceeding the threshold selected during the selected time may be displayed differently according to state and occurrence frequency of a resource.

FIGS. 9A, 9B, 9C, 9D and 9E illustrate displaying of detection information of an abnormal current consumption application in an electronic device according to embodiments of the present disclosure.

Figure 9D:
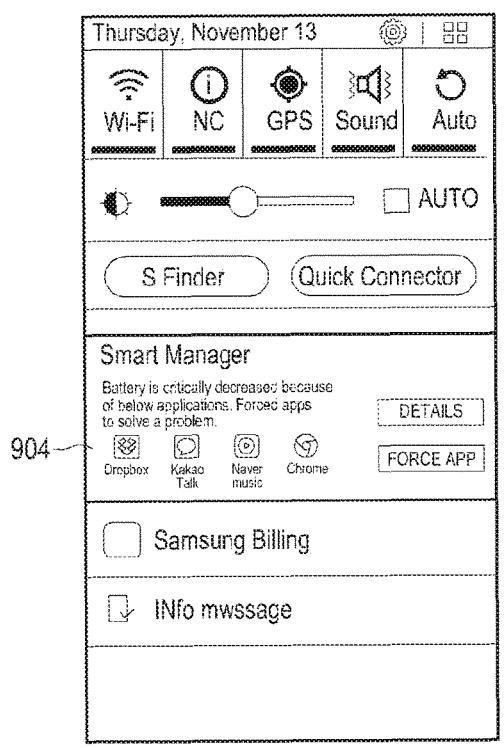
Figure 9E:
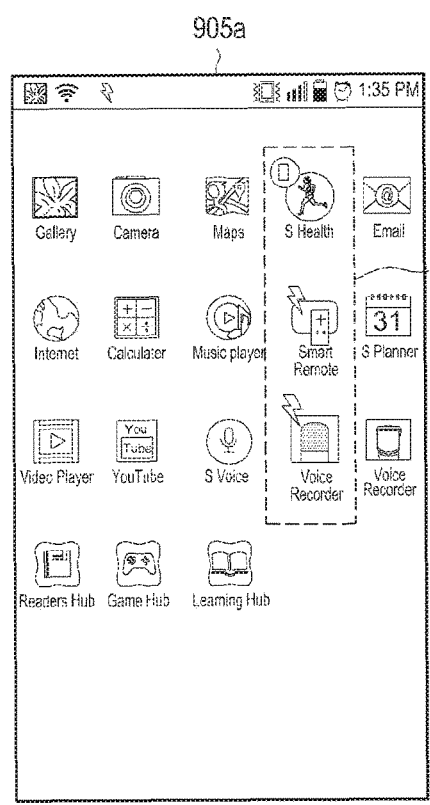

Detection information of an abnormal current consumption application detected from at least one application running in the electronic device may be displayed using a popup message 901 on an execution screen of a particular application as illustrated in FIG. 9A using a popup message 902 on a lock screen as illustrated in FIG. 9B, or a popup message 903 on an idle screen as illustrated in FIG. 9C. The detection information may also be displayed using a notification panel 904 as illustrated in FIG. 9D or using an icon indicating the abnormal current consumption application as illustrated in FIG. 9E. The foregoing displaying methods are an example, and the detection information may be displayed using at least some regions of the screen.

As illustrated in FIG. 9E, an icon 905*a* indicating detection of the abnormal current consumption application is displayed on an indication region. An icon indicating the abnormal current consumption application displays an indication 905*b* indicating detection of an abnormal current consumption application. The indication displayed on the icon may have different sizes, shapes, or types according to a detection time or a current consumption amount.

FIGS. 10A, 10B, 10C and 10D illustrate processing of detection information of an abnormal current consumption application in an electronic device according to embodiments of the present disclosure.

If an abnormal current consumption application is detected in an idle mode of an electronic device as illustrated in FIG. 10A, detection information of the abnormal current consumption application, which includes a type 1002 of the abnormal current consumption application, detection details 1001 of the abnormal current consumption application, and a control function 1003 with respect to the abnormal current consumption application, is displayed using a popup message on an idle screen as illustrated in FIG. 10B.

If "uninstall" is selected out of the control function 113 with respect to the abnormal current consumption application in FIG. 10B, a screen for uninstallation is displayed as illustrated in FIG. 10C and if "END" is selected out of the control function 113 with respect to the abnormal current consumption application, a screen for termination is displayed as illustrated in FIG. 10D.

FIGS. 11A, 11B, 11C and 11D illustrate a function of setting a notification for abnormal current consumption in an electronic device according to embodiments of the present disclosure.

Figure 11A:
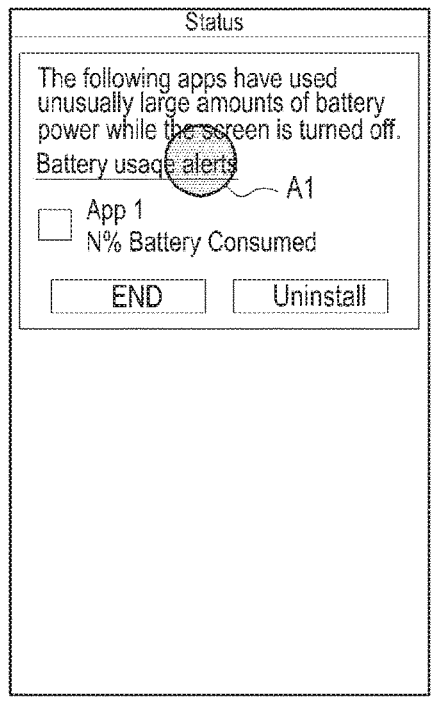
FIGS. 11A, 11B, 11C and 11D illustrate a function of setting a notification for abnormal current consumption in an electronic device according to embodiments of the present disclosure.
Figure 11B:
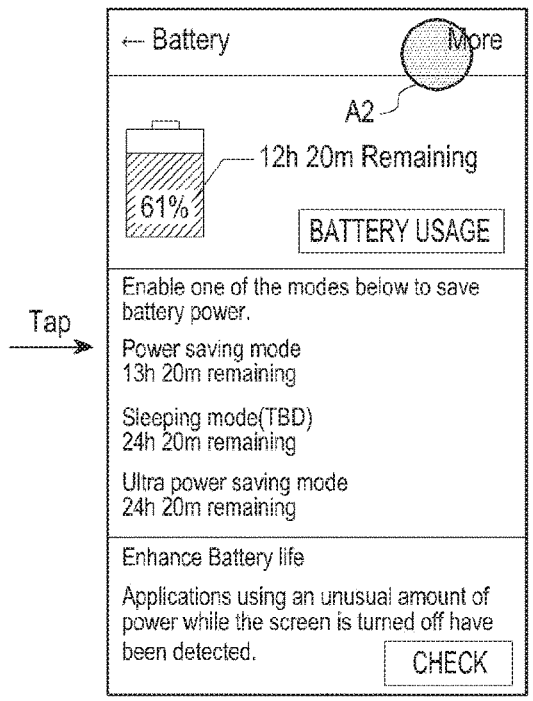
Figure 11D:
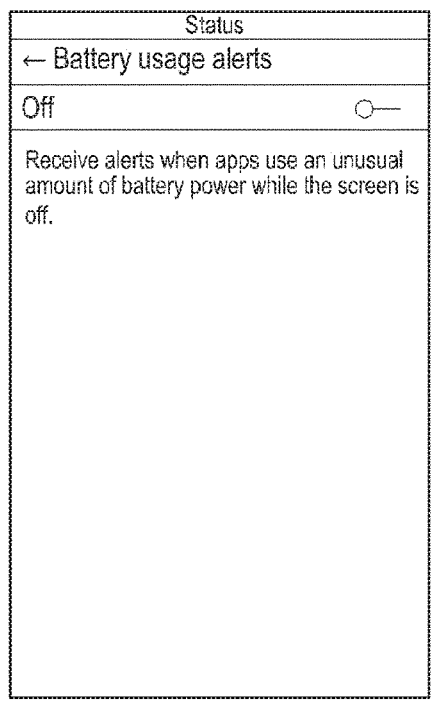
Figure 11C:
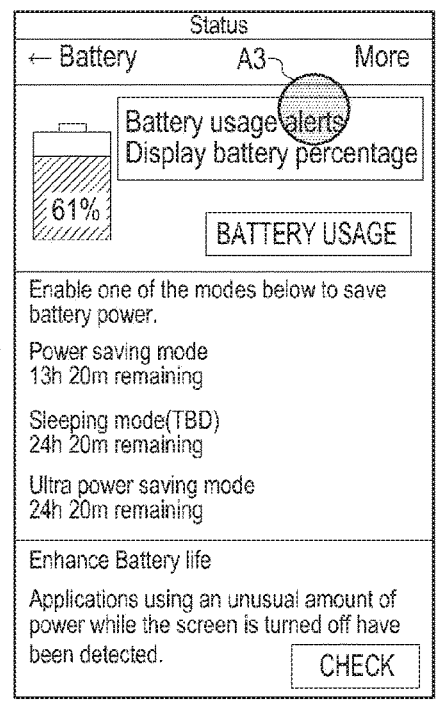

If "Battery usage alerts" A1 for setting abnormal current consumption notification is selected during displaying of detection information of an abnormal current consumption application using a popup message as illustrated in FIG. 11A, "More" A2 is selected as illustrated in FIG. 11B, and "Battery usage alerts" A3 is selected in FIG. 11C, then a menu for setting abnormal current consumption notification may be displayed as illustrated in FIG. 11D. In FIG. 11D, according to user's selection of activation (on) or inactivation (off), reception or non-reception of an abnormal current consumption notification may be set.

Figure 12A:
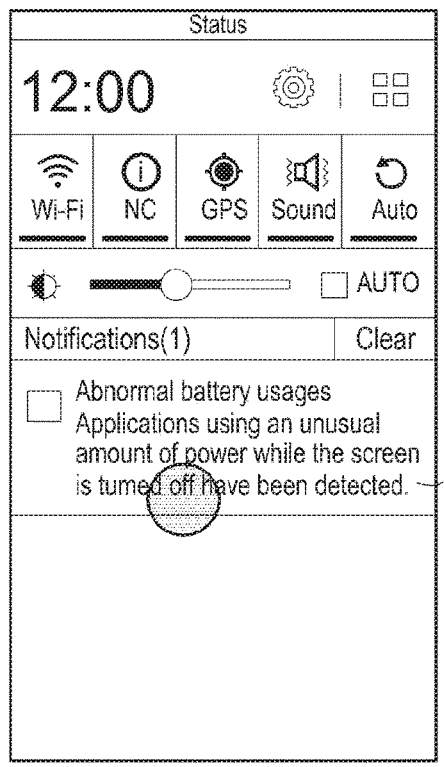
FIGS. 12A and 12B illustrate processing of detection information of an abnormal current consumption application using a notification window in an electronic device according to embodiments of the present disclosure.
Figure 12B:
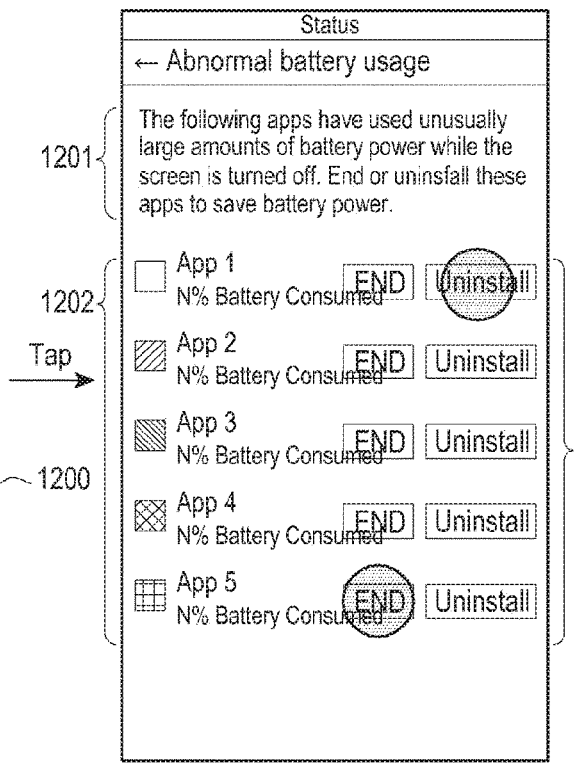

FIGS. 12A and 12B illustrate processing of detection information of an abnormal current consumption application using a notification window in an electronic device according to embodiments of the present disclosure.

If an abnormal current consumption application is detected in an idle mode of an electronic device as illustrated in FIG. 12A, detection of the abnormal current consumption application is notified on a notification panel 1200, and if the notification panel 1200 or detection notification on the notification panel 1200 is selected, then detection information of the abnormal current consumption application, which includes a type 1202 of the abnormal current consumption application, detection details 1201 of abnormal current consumption application, and a control function 1203 with respect to the abnormal current consumption application, may be displayed as illustrated in FIG. 12B.

Figure 13:
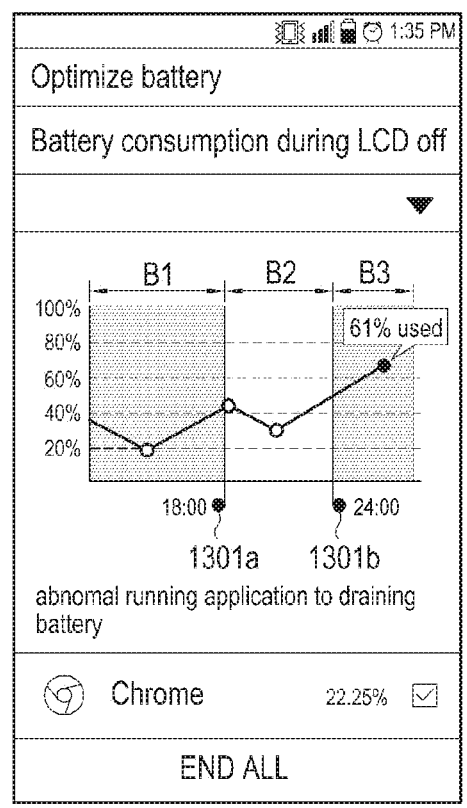
FIG. 13 illustrates displaying of detailed information of an abnormal current consumption application in an electronic device according to embodiments of the present disclosure.

FIG. 13 illustrates displaying of detailed information of an abnormal current consumption application in an electronic device according to embodiments of the present disclosure.

If a particular type of an application is selected from the type of the abnormal current consumption application during the displaying of the detection information of the abnormal current consumption application, current consumption information of the selected application is displayed in details using a graph as illustrated in FIG. 13. For example, the current consumption information includes at least one of current consumption information based on a state of a resource, such as on state, off state, or brightness state of a display, and a detected or current use amount and use frequency of a CPU or a memory, for example.

FIG. 13 shows the amount of current consumed by a particular application, such as Chrome) per time zone when a display is in the off state. In FIG. 13, a time zone B1 and a time zone B3 correspond to the off state of the display.

In FIG. 13, the user may designate a time zone by using handlers 1301*a* and 1301*b*, and current consumption information for the time zone designated by the user may be displayed.

Figures 14A, 14B, 14C:
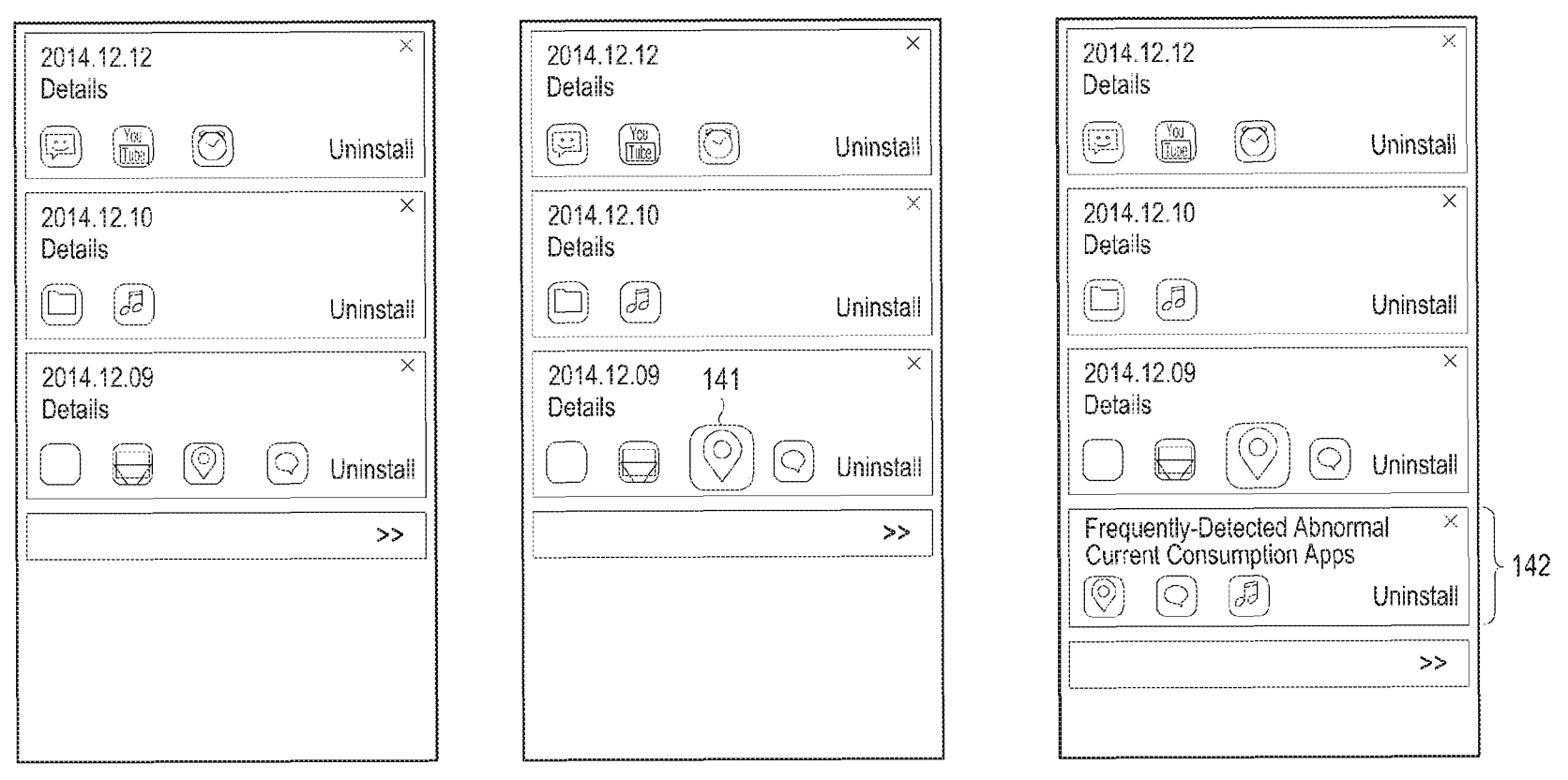

FIGS. 14A, 14B and 14C illustrate displaying of a history of an abnormal current consumption application in an electronic device according to embodiments of the present disclosure.

As illustrated in FIG. 14A, a history of abnormal current consumption applications stored from the past to the present is displayed using icons in the order of detected time in a card view form. Although only types of the abnormal current consumption applications are indicated using the icons in FIG. 14A, at least one of battery use details and a control function may also be displayed.

In addition, as illustrated in FIG. 14B, during the displaying of the history of the abnormal current consumption applications stored from the past to the present by using the icons in the order of detected time in the card view form, an icon 141 corresponding to an abnormal current consumption application having the highest detection frequency is displayed in a distinguishable manner from other icons.

As illustrated in FIG. 14C, during the displaying of the history of the abnormal current consumption applications stored from the past to the present by using the icons in the order of detected time in the card view form, icons corresponding to a predetermined number of abnormal current consumption applications in the order of highest to lowest detection frequencies 142 are displayed on a separate region, in a card view.

The card view form is an example of a display form, however, and other forms may be used.

Figure 15:
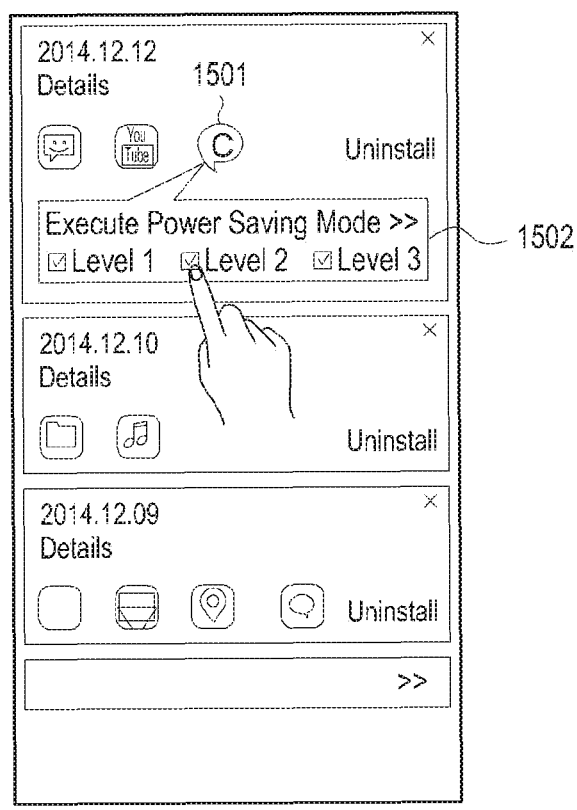
FIG. 15 illustrates setting of a power saving mode of an abnormal current consumption application in an electronic device according to embodiments of the present disclosure.

FIG. 15 illustrates setting of a power saving mode of an abnormal current consumption application in an electronic device according to embodiments of the present disclosure.

As illustrated in FIG. 15, during the displaying of the history of the abnormal current consumption applications stored from the past to the present by using the icons in the order of detected time in the card view form, if a power saving mode for a particular application 1501 is selected, levels 1502 of the power saving mode are displayed. If one is selected from among the levels of the power saving mode, the selected power saving mode level is set as a power saving mode level of the application 1501.

Figures 16A, 16B:
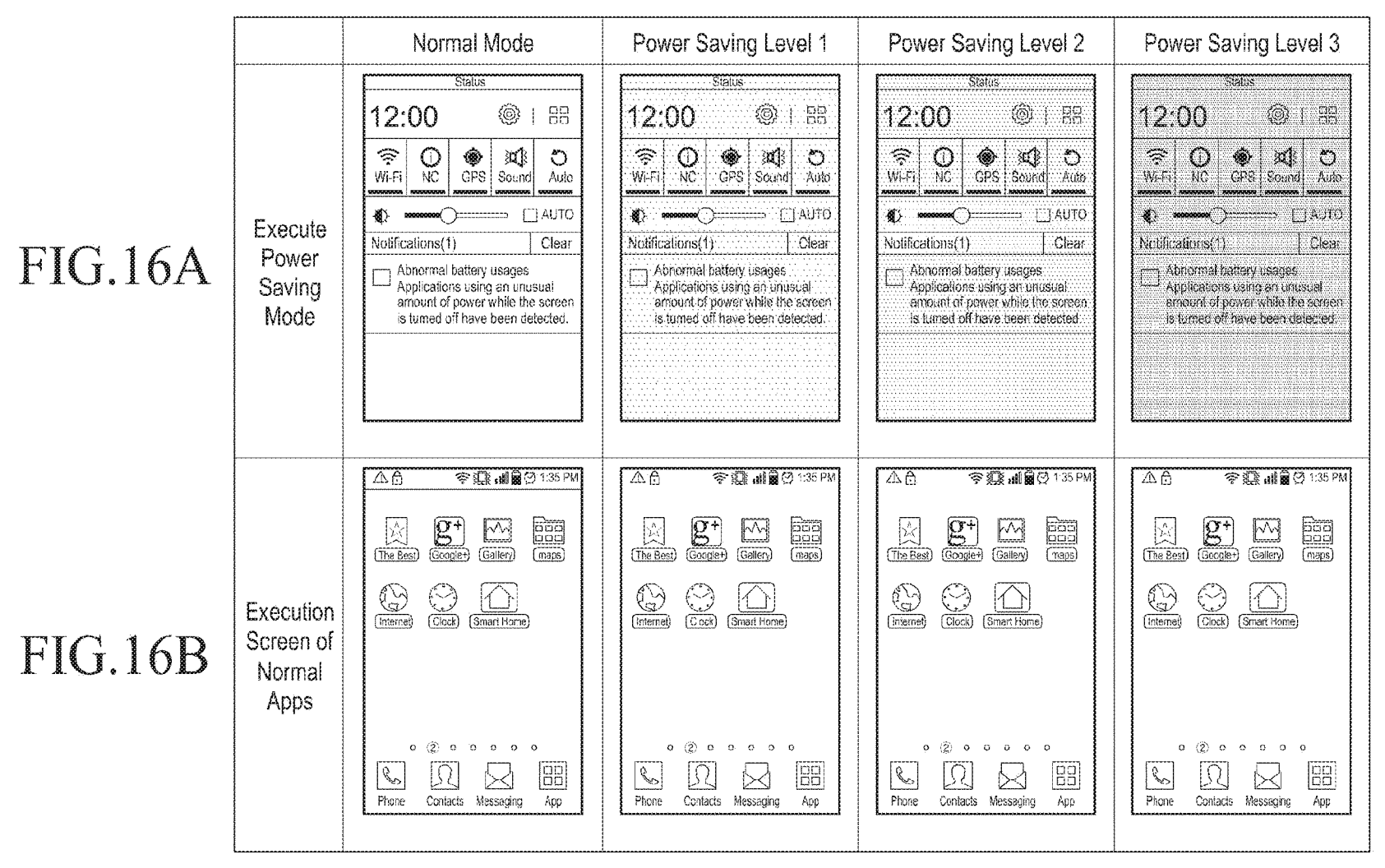

FIGS. 16A and 16B illustrate a screen switchover in a power saving mode of an abnormal current consumption application in an electronic device according to embodiments of the present disclosure.

In FIG. 16A, during execution of an abnormal current consumption application, an execution screen corresponding to a power saving mode level set for the abnormal current consumption application is displayed. In FIG. 16B, during execution of a normal application, an execution screen of the normal application for which a power saving mode is not set is displayed.

As illustrated in FIG. 16A, an application selected to be executed in a power saving mode among the abnormal current consumption applications runs in the power saving mode, and in FIG. 16B, a normal application, i.e., a normal current consumption application, does not run in the power saving mode. No restriction is applied to a screen mode such as a brightness of the screen in a normal mode, whereas in the power saving mode, the screen mode may vary with a level of the power saving mode. For example, for a power saving mode level 1, current consumption may be reduced by applying changes such as brightness reduction or color tone adjustment to the screen color of the display, as shown. For a power saving mode level 2, a change value applied to the screen color of the display is decreased to reduce the current consumption of the display when compared to the power saving mode level 1. For a power saving mode level 3, the current consumption of the display is minimized by using a monochromatic (or black and white) display According an embodiment, at least one of power saving mode information, a power saving mode termination function, and a power saving mode setting change function may be displayed on a partial region of an application.

FIGS. 17, 18A, 18B, 19A, 19B, 19C, 19D, 20A, 20B, 20C and 20D illustrate smart managers of an electronic device according to embodiments of the present disclosure.

Figure 17:
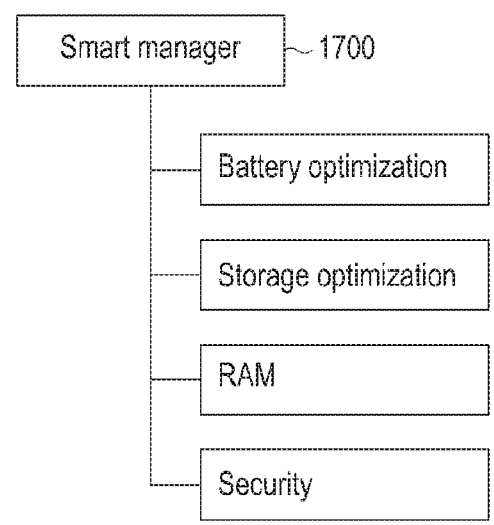
FIGS. 17, 18A, 18B, 19A, 19B, 19C, 19D, 20A, 20B, 20C and 20D illustrate a smart manager of an electronic device according to embodiments of the present disclosure.

As illustrated in FIG. 17, a smart manager 1700 enables efficient use of an electronic device with a simple manipulation. The smart manager 1700 provides state information about and management with respect to Battery, Storage, RAM, and Security categories.

Figure 18A:
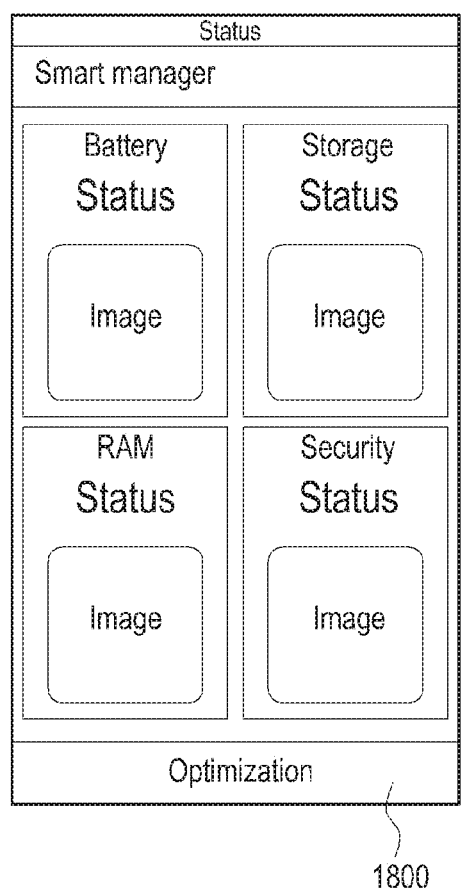
Figure 18B:
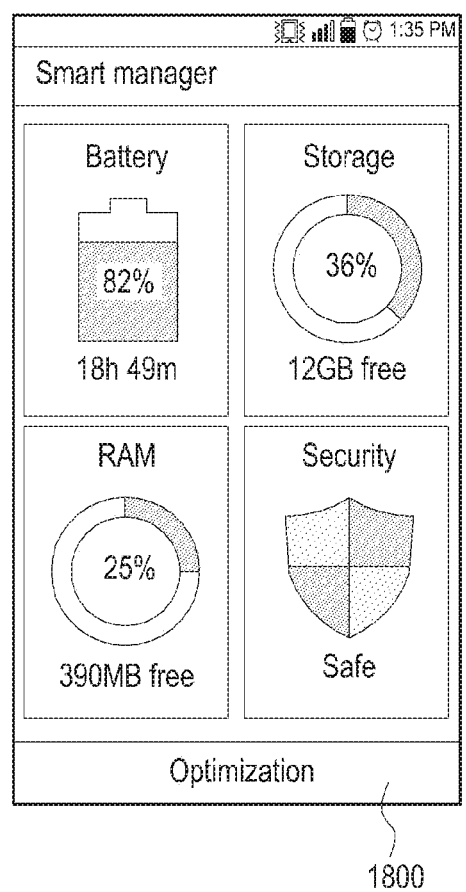

FIG. 18A illustrates an example of a main screen of a smart manager. On the main screen, state display icons and information about Battery, Storage, RAM, and Security categories may be provided. For example, as illustrated in FIG. 18B, Battery information includes an indication of expected use time. Storage information includes an indication of the remaining capacity or amount of use. RAM information includes an indication of the remaining capacity or amount of use. Security information includes an indication of whether malware is detected.

Figure 19D:
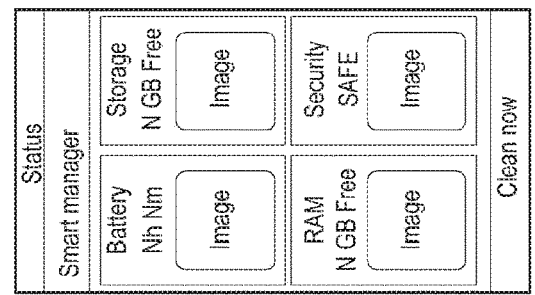
Figure 19C:
Figure 19B:
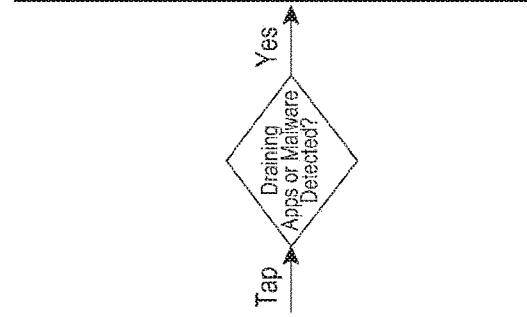
Figure 19A:
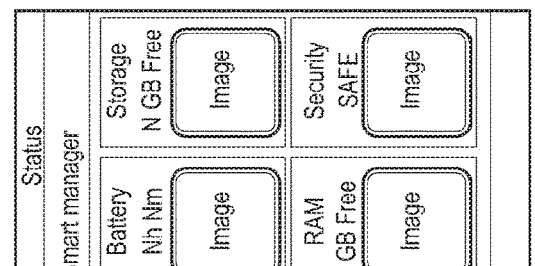

On the main screen of the smart manager is included a button 1800 capable of optimizing all categories at a given time. Once the optimization button 1800 is selected, optimization is performed for each category and a result of the optimization is displayed. For example, if an optimization button 1900 is selected as illustrated in FIG. 19A, a visual effect may be given to a category icon during the optimization as illustrated in FIG. 19B. If any problem such as detection of abnormal current consumption or malware is discovered during the optimization, a notification may be provided to the user as illustrated in FIG. 19C. If "OK" is selected in FIG. 19C, a screen corresponding to a state before the providing of the notification to the user may be displayed as illustrated in FIG. 19D.

Figure 20A:
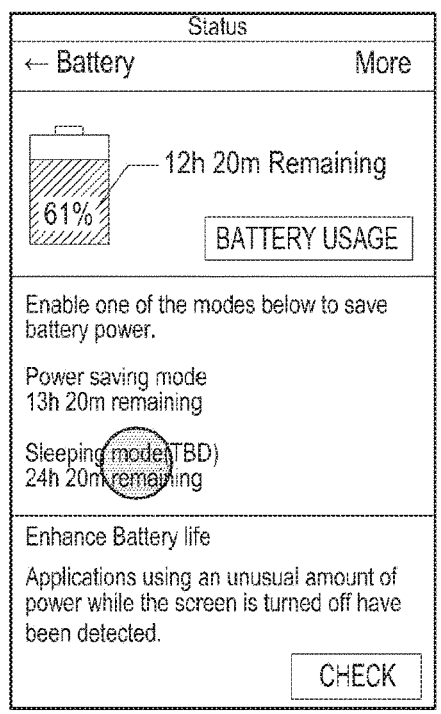
Figure 20B:
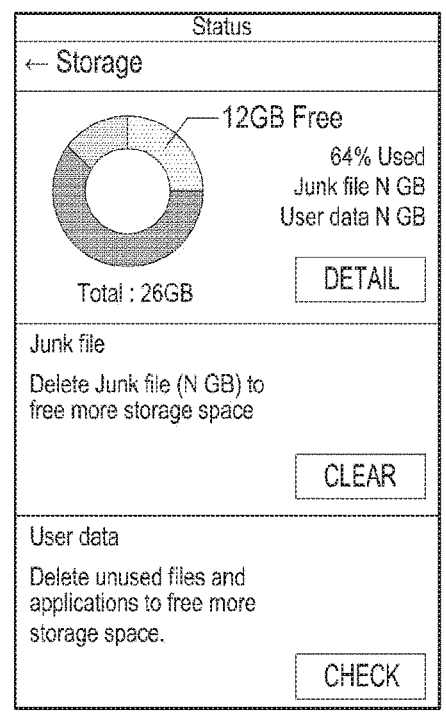
Figure 20C:
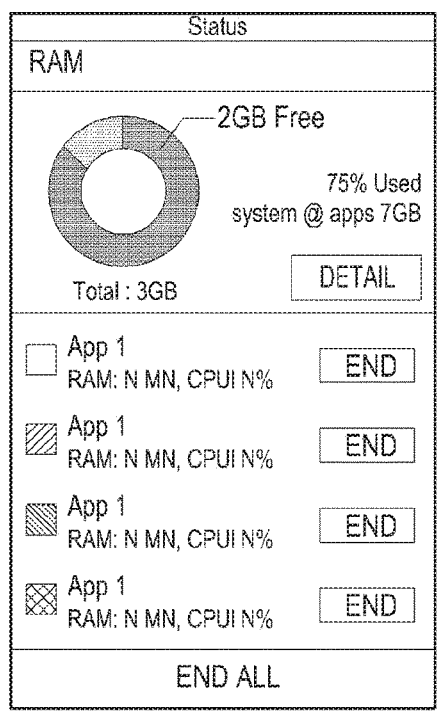
Figure 20D:
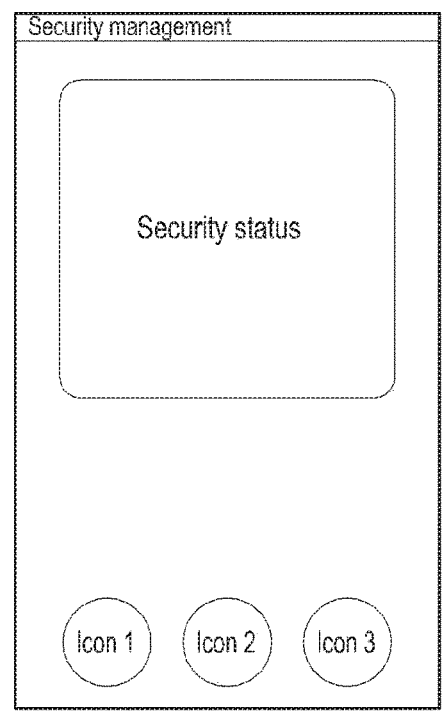

On the main screen of the smart manager, upon selection of a particular category, a details screen of the category may be displayed. FIG. 20A illustrates a detailed screen of a selected Battery category, FIG. 20B illustrates a detailed screen of a selected Storage category, FIG. 20C illustrates a detailed screen of a selected RAM category, and FIG. 20D illustrates a detailed screen of a selected Security category.

FIGS. 21, 22A, 22B, 23A, 23B, 24A, 24B, 25A, 25B, 26A, 26B, 26C, 26D, 27A, 27B and 27C illustrate providing of battery information managed by a smart manager of an electronic device according to embodiments of the present disclosure.

Figure 21:
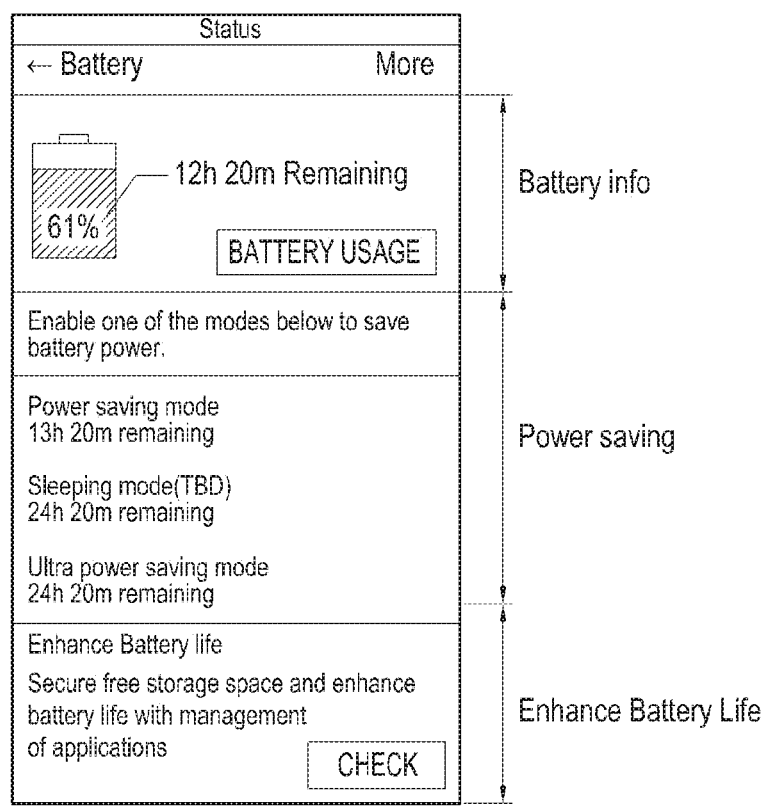

FIG. 21 illustrates a Battery screen. As illustrated in FIG. 21, the Battery category includes Battery Info, Power Saving, or Enhance Battery Life. Battery Info shows an available battery time based on the current point in time. Battery Usage shows details of use of the battery. Power Saving shows a power saving mode that may be provided or available to the user and an expected use time for each power saving mode. Enhance Battery Life provides a function capable of lengthening the lifespan of the battery.

Figure 22A:
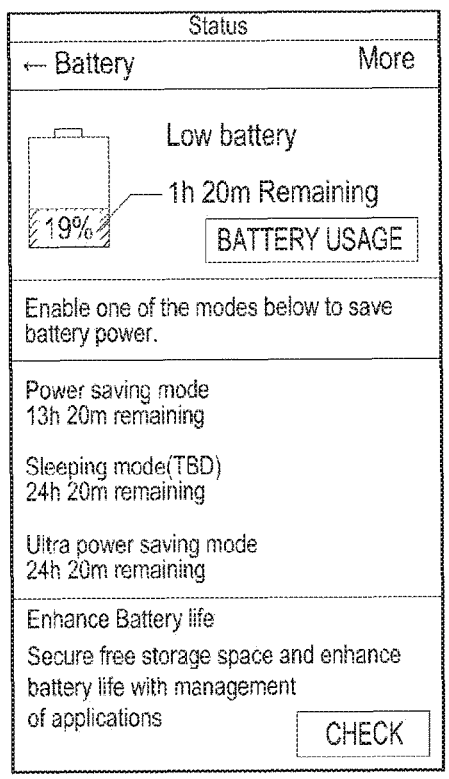
Figure 22B:
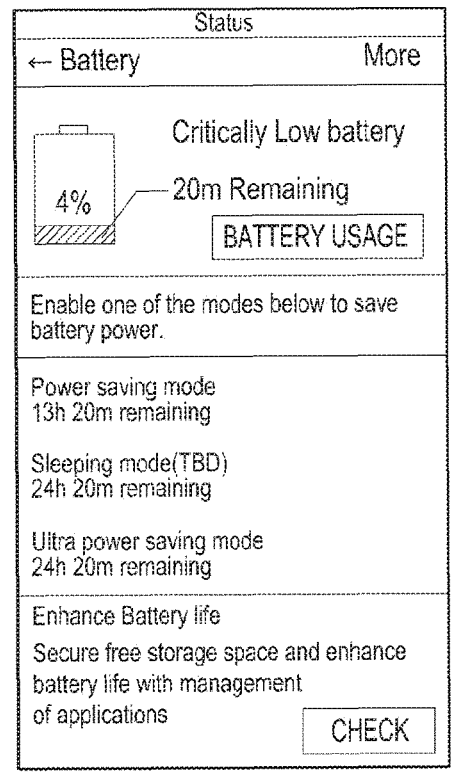

FIGS. 22A and 22B illustrate Battery Info screens showing the remaining battery level. As illustrated in FIGS. 22A and 22B, on the Battery Info screen, an image or a phrase indicating a state of the battery may be changed according to a predefined criterion.

Figure 23A:
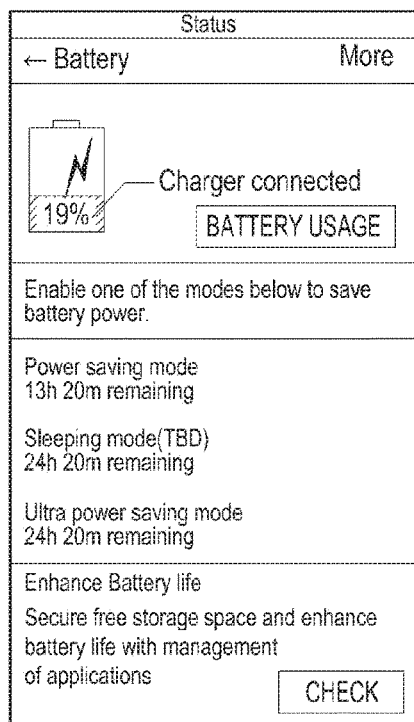
Figure 23B:
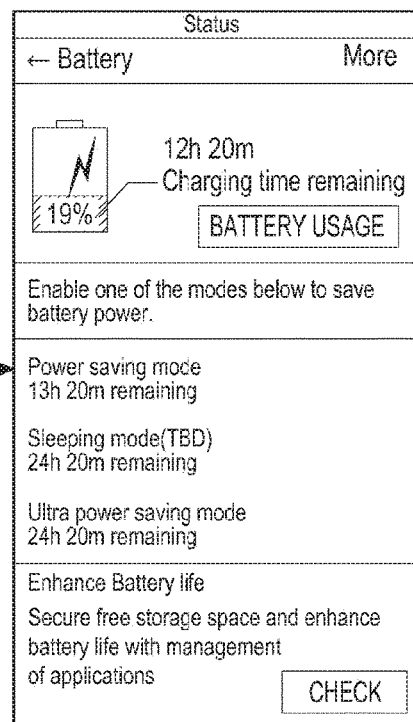
Figure 24A:
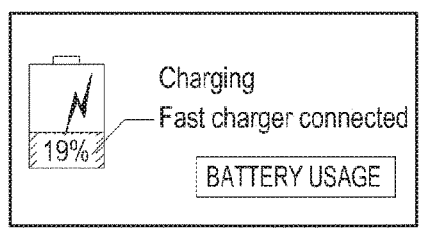
Figure 24B:
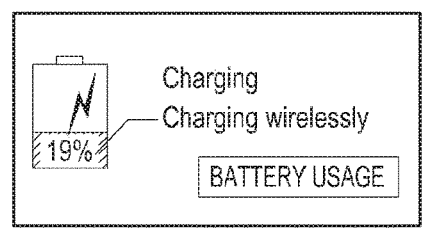

FIGS. 23A and 23B illustrate example of the Battery Info screens indicating charging, and FIGS. 24A and 24B illustrate examples of an Info screen indicating a charging scheme.

Figure 25A:
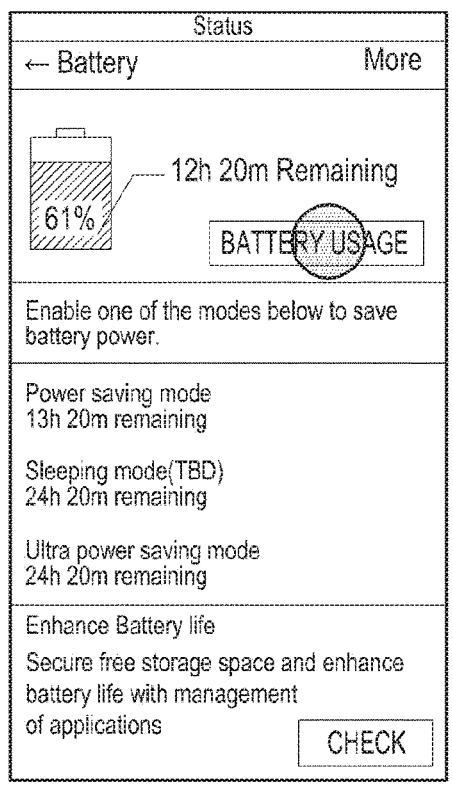
Figure 25B:
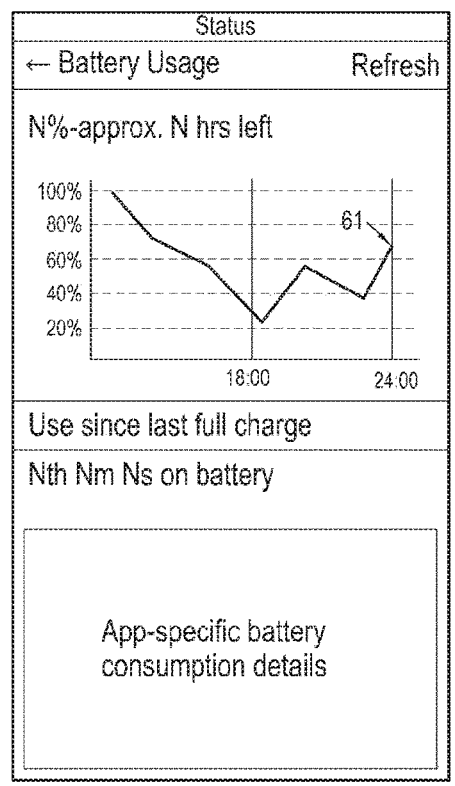

If Battery Usage is selected on the Battery screen, details information about battery consumption may be displayed. If Battery Usage is selected as illustrated in FIG. 25A, at least one of an expected available time, a battery consumption graph, a use time after the last charging, and application-specific battery consumption details may be displayed as illustrated in FIG. 25B. The battery consumption graph may have various display conditions. For example, a battery consumption inquiry time may be designated. A particular application, service, or hardware may be selected to display the battery consumption graph. The battery consumption graph may also be displayed for a background application or service. The battery consumption graph may be displayed based on a screen on or off state. The application-specific battery consumption details may vary with the display condition of the battery consumption graph.

On the Battery screen, Enhance Battery Life detects and displays an application that abnormally consumes the battery and also terminates (or ends) or uninstalls the application.

FIGS. 26A, 26B, 26C and 26D illustrate Enhanced Battery Life. If the application that abnormally consumes the battery is detected, the name of "Enhance Battery Life" or details or color of this category is displayed in a distinguishable manner to provide information to the user. If the user selects a button 2601 for checking details information in FIG. 26A, the user may move to an Abnormal Battery tab and a list of detected applications may be displayed as illustrated in FIG. 26B. Items of the application list include at least one of an application name, an application icon, battery consumption information, application termination, and application uninstallation.

Figures 27A, 27B, 27C:
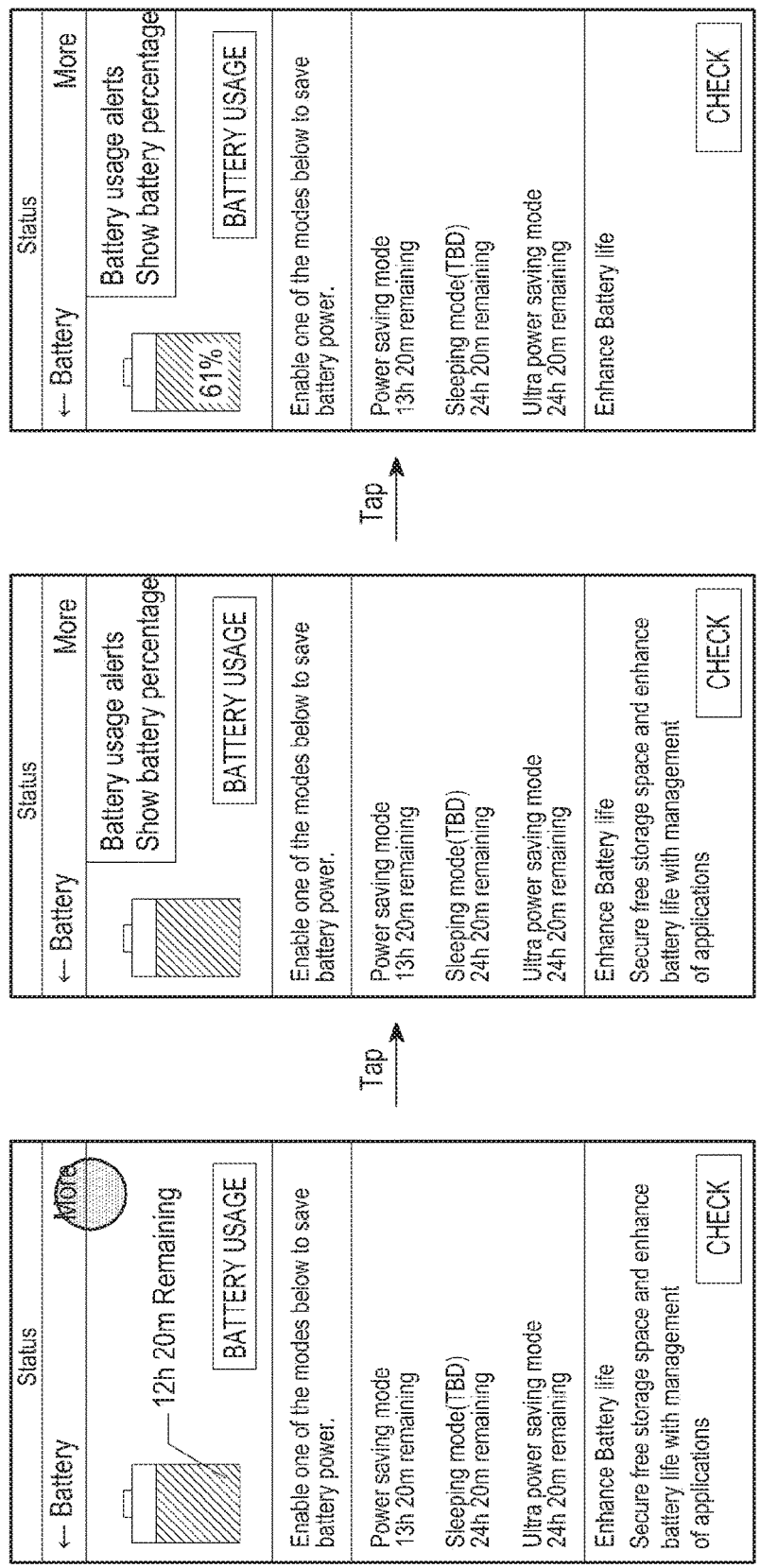

In addition, the user performs setting for a GUI and battery notification. For example, as illustrated in FIGS. 27A, 27B and 27C, the user may set whether to indicate the remaining battery capacity with a value or whether to receive a notification regarding an application that abnormally consumes the battery.

FIGS. 28, 29A, 29B, 29C, 30A, 30B, 30C, 31A, 31B, 31C, 31D, 32A, 32B, 32C, 32D, 33A, 33B, 33C, 33D, 34A, 34B and 34C illustrate providing of storage information managed by a smart manager of an electronic device according to embodiments of the present disclosure.

Figure 28:
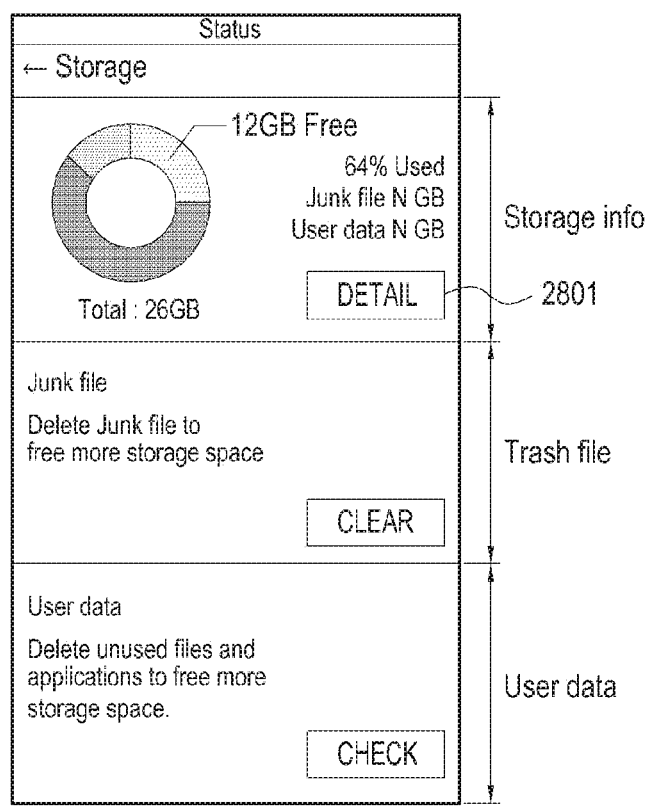
Figure 31A:
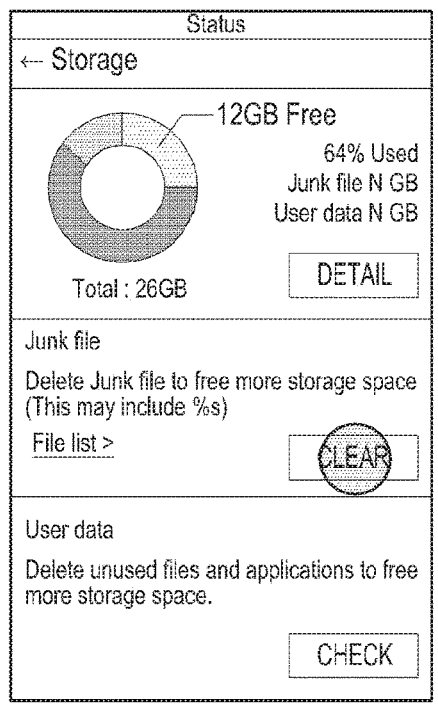
Figure 31B:
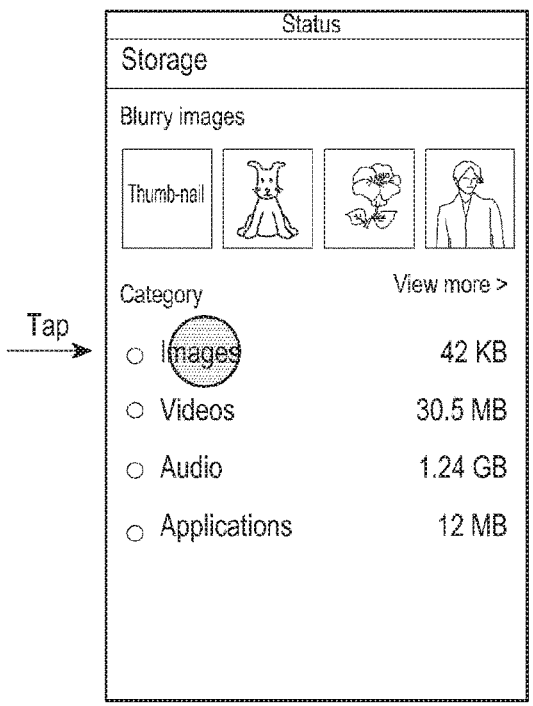
Figure 31D:
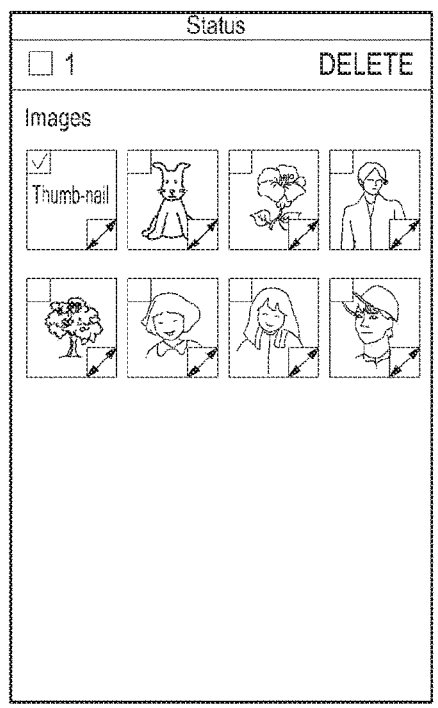
Figure 31C:
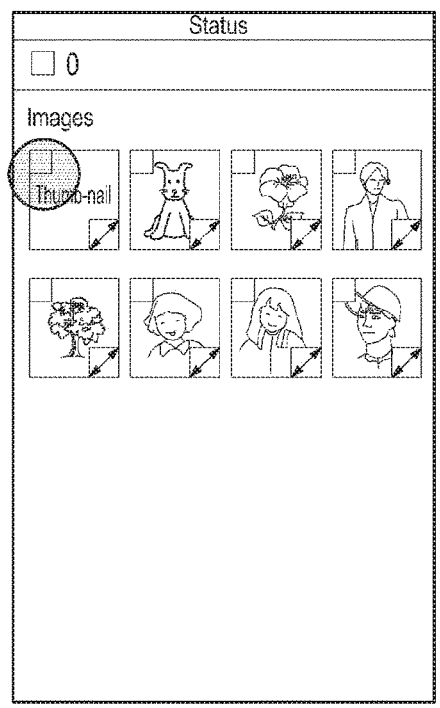
Figure 32A:
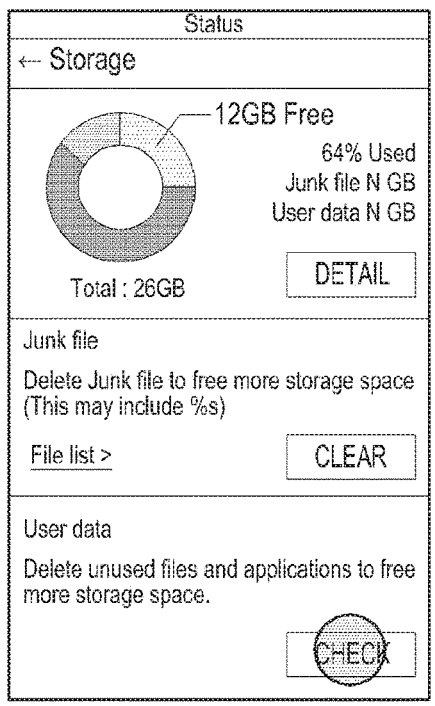
Figure 32B:
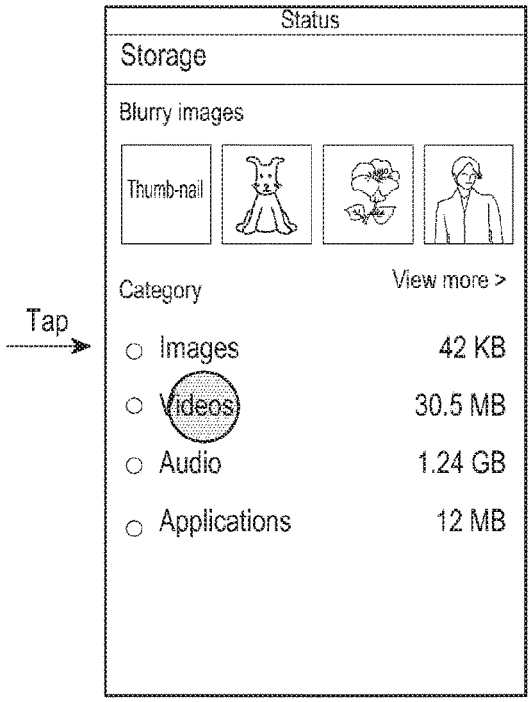
Figure 32D:
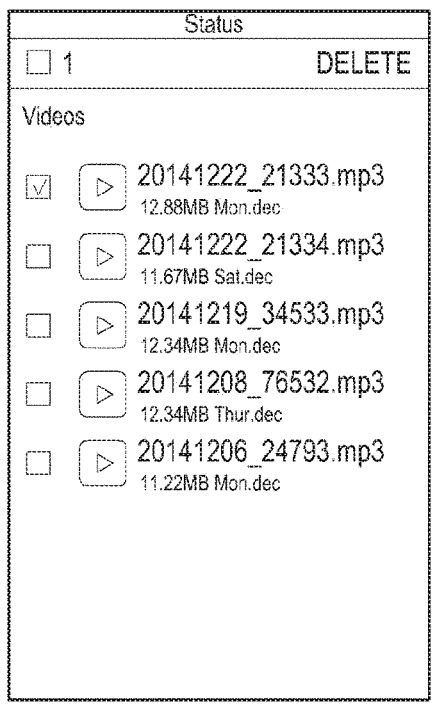
Figure 32C:
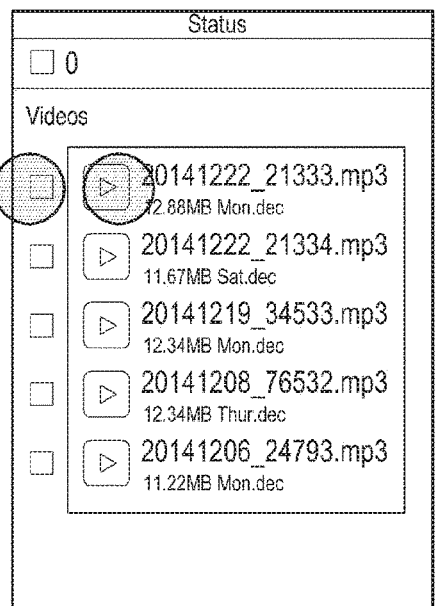
Figure 33A:
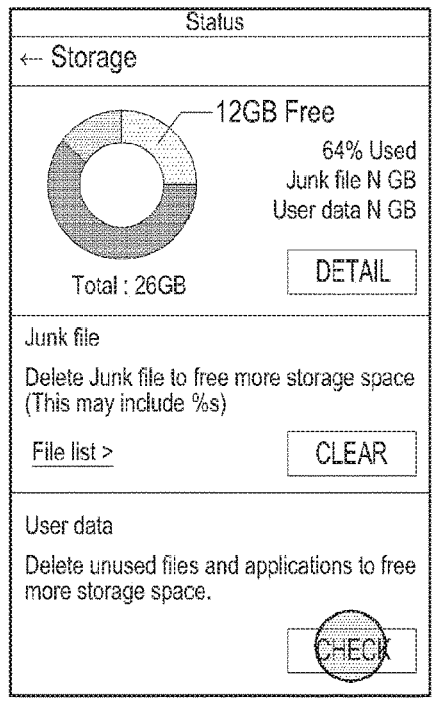
Figure 33B:
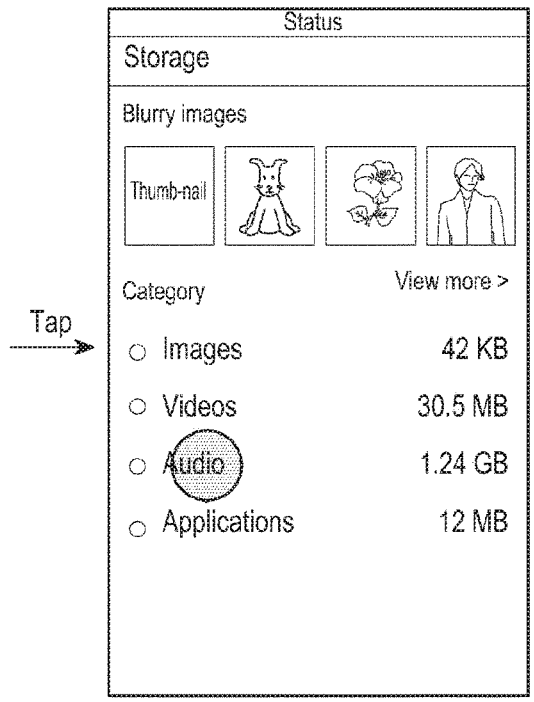
Figure 33D:
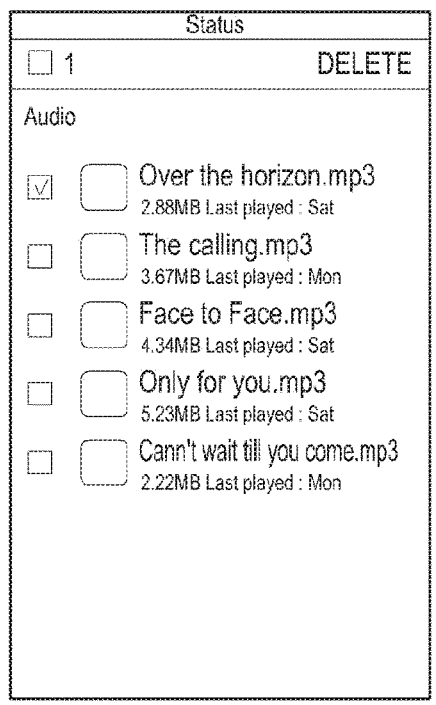
Figure 33C:
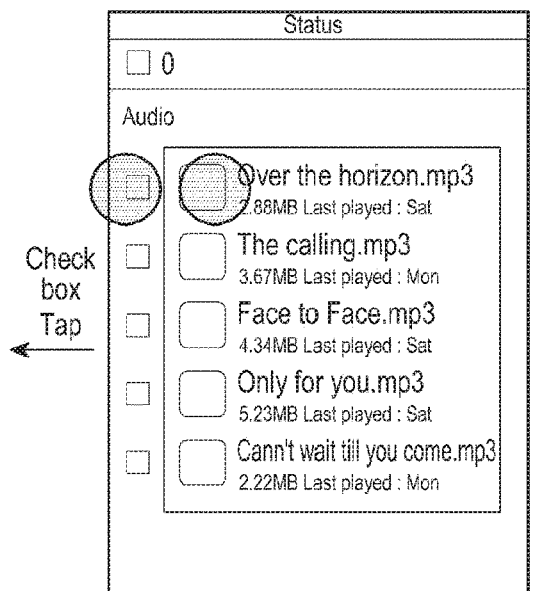

The Storage category includes Storage info, Trash file, and User data. FIG. 28 illustrates Storage. In FIG. 28, Storage info shows a current state of Storage in the form of a chart that includes one or more items. For example, the chart includes one or more of a free region, an unnecessary file region, and a used space region. If a button DETAIL 2801 is selected, detailed information is provided. The Trash file provides a function of displaying and deleting information of a junk file such as a temporary file. User data includes a function capable of arranging an unnecessary file or application.

FIGS. 29A, 29B, and 29C illustrate deletion of a junk file, according to embodiments of the present disclosure. In FIG. 29A, the deletion is performed by pressing a button CLEAR 2901. As illustrated in FIG. 29B, during the deletion, a progress state is displayed using a visual effect. After completion of the deletion, Storage state information is updated and displayed or a result of the deletion is displayed as illustrated in FIG. 29C.

FIGS. 30A, 30B, and 30C illustrate other examples of deletion of a junk file. If a file list is selected as illustrated in FIG. 30A, an application list is displayed as illustrated in FIG. 30B in which the user may selectively delete or clear a junk file associated with a particular application. Applications in the application list may include all the installed applications or applications including junk files. For an application list of applications including junk files, prior to displaying of the application list, it may be determined whether a junk file exists in each application. After completion of the deletion, Storage state information is updated and displayed as illustrated in FIG. 30C.

In the Storage category, User data shows a file or application detected according to a predefined condition to allow the user to arrange the file or application. For example, the predefined condition may include the number of times a multimedia file is played, the number of times an application is executed, the clarity of an image or a video, similarity between an image and a video, or existence in another device or a server. User data may also show a normal file or installed application to allow the user to arrange the file or application.

FIGS. 31A, 31B, 31C and 31D illustrate examples of User data in which the user may select and delete images (including a picture) stored in the electronic device. FIGS. 32A, 32B, 32C and 32D illustrate examples of User data in which the user may select and delete videos stored in the electronic device. FIGS. 33A, 33B, 33C and 33D illustrate examples of User data in which the user may select and delete audio stored in the electronic device. FIGS. 34A, 34B and 34C illustrate examples of User data in which the user may select and delete applications stored in the electronic device.

FIGS. 35, 36A, 36B and 36C illustrate providing of random access memory (RAM) information managed by a smart manager of an electronic device according to embodiments of the present disclosure.

The RAM category includes at least one of Memory Information, Running apps, and a control function (END ALL).

Figure 35:
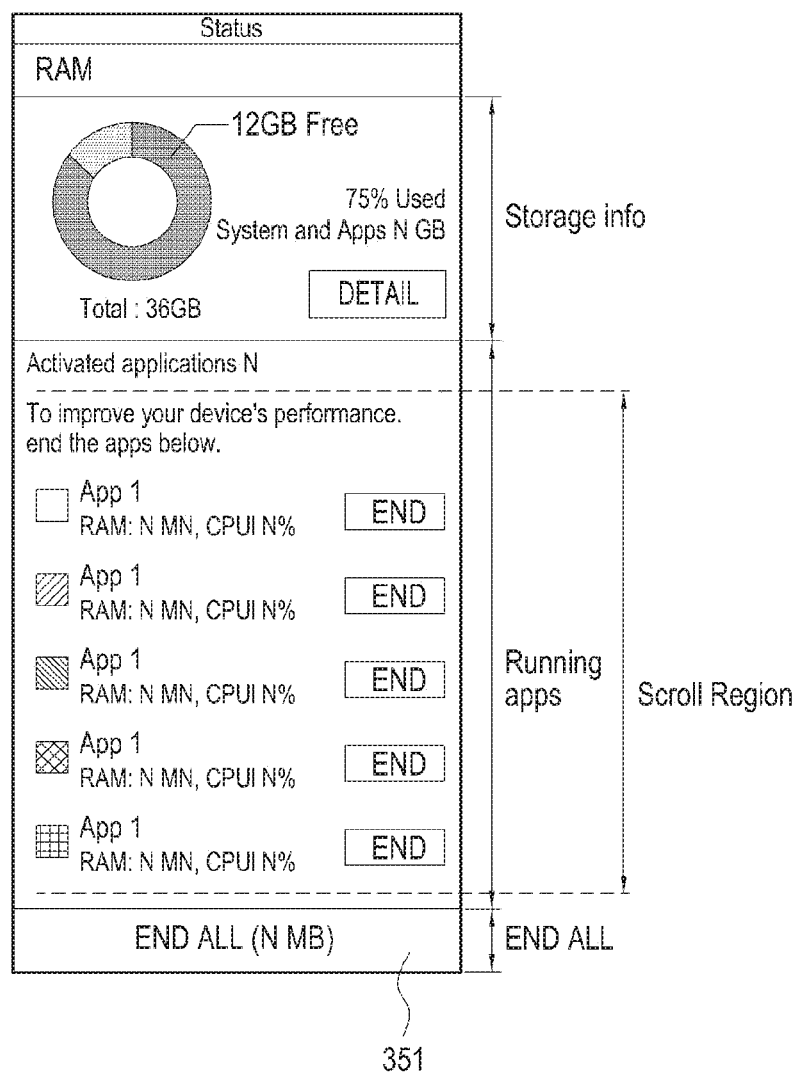

FIG. 35 illustrates an example of a RAM. Referring to FIG. 35, Memory Information shows a current Memory state in the form of a chart including one or more items. For example, at least one of a Free space, a System use space, and an Apps use space may be provided. Depending on a predefined size condition for the Free space, a color of the chart may change. For example, for a Free space of 15% or less, the color of the chart may be changed to a reddish color. Running apps show a list of currently running or activated applications or services. An application or service essential for the system or selected by the user may be excluded from the list. During the displaying of the list, Memory use amount and CPU occupancy rate of the application or service may be displayed or the application may be terminated. If END ALL 351 is selected, all of the applications of the Running apps list are terminated.

FIGS. 36A, 36B and 36C illustrate examples of operations corresponding to selection of a button END ALL. If the button END ALL is selected as shown in FIG. 36A, an application or service among Running apps is terminated. As illustrated in FIG. 36B, a visual effect may be displayed during termination of the application or service. As illustrated in FIG. 36C, during termination of the application or service, or after completion of the termination, a Memory state may be updated and displayed.

FIGS. 37A, 37B, 37C, 38A, 38B, 38C, 39A and 39B illustrate controlling a storage space of a storage unit managed by a smart manager of an electronic device according to embodiments of the present disclosure.

If a storage space is insufficient, a notification is provided to the user and a means for securing more space is provided. FIGS. 37A and 37B illustrate an example of giving a notification using a popup when there is a lack of storage space during generation of a file. An insufficient storage space notification message and storage information are provided in the popup. In addition, a button for entering a storage of the smart manager may also be provided.

Figures 38A, 38B, 38C:
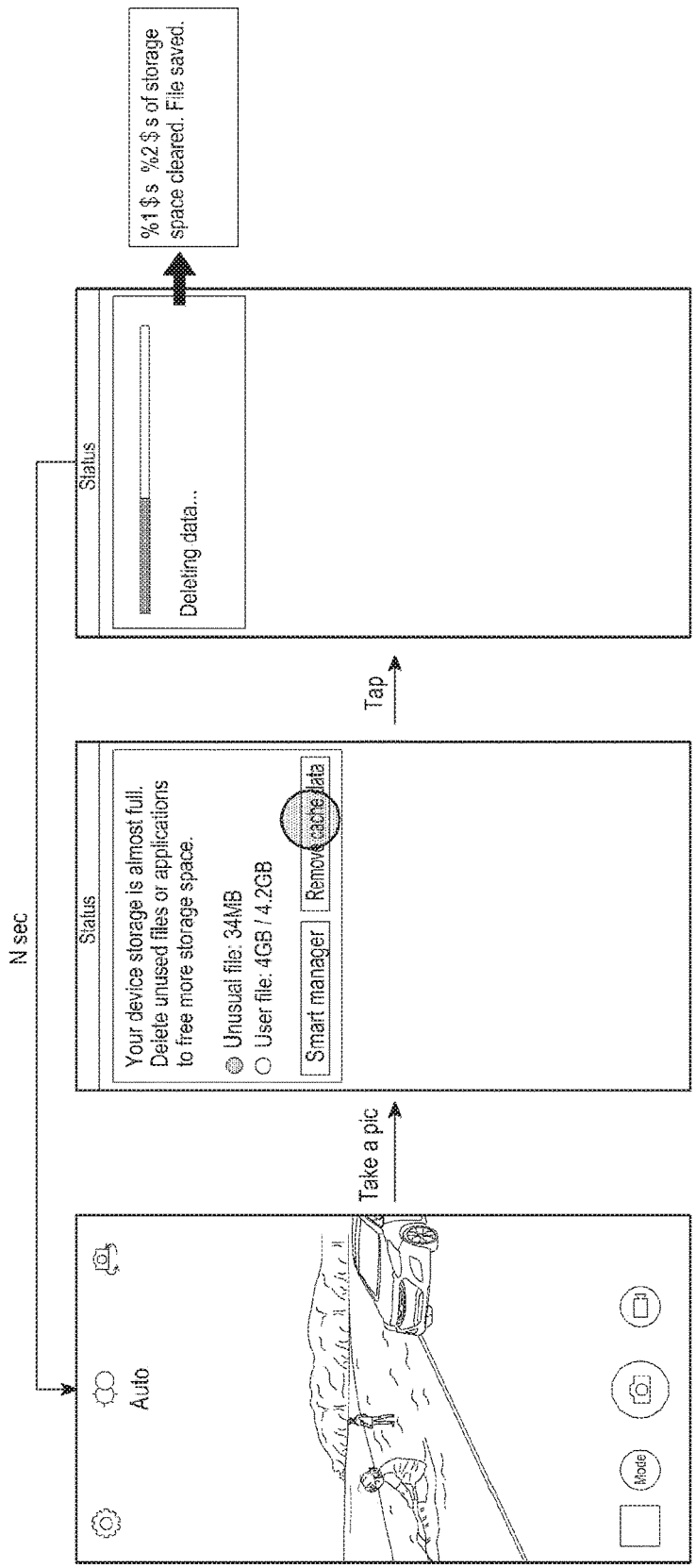

FIGS. 38A, 38B, and 38C illustrate examples of giving a notification using a popup if a storage space is insufficient and a cache file occupies a predetermined space or larger during generation of a file. A criterion for giving a notification with respect to a cache file is a predefined or user-set size. An insufficient storage space notification message and storage information are provided in the popup. A button for entering a storage of a smart manager or for deleting cache data may also be provided in the popup. After deletion of the cache data, the screen returns to the original screen.

Figures 39A, 39B:
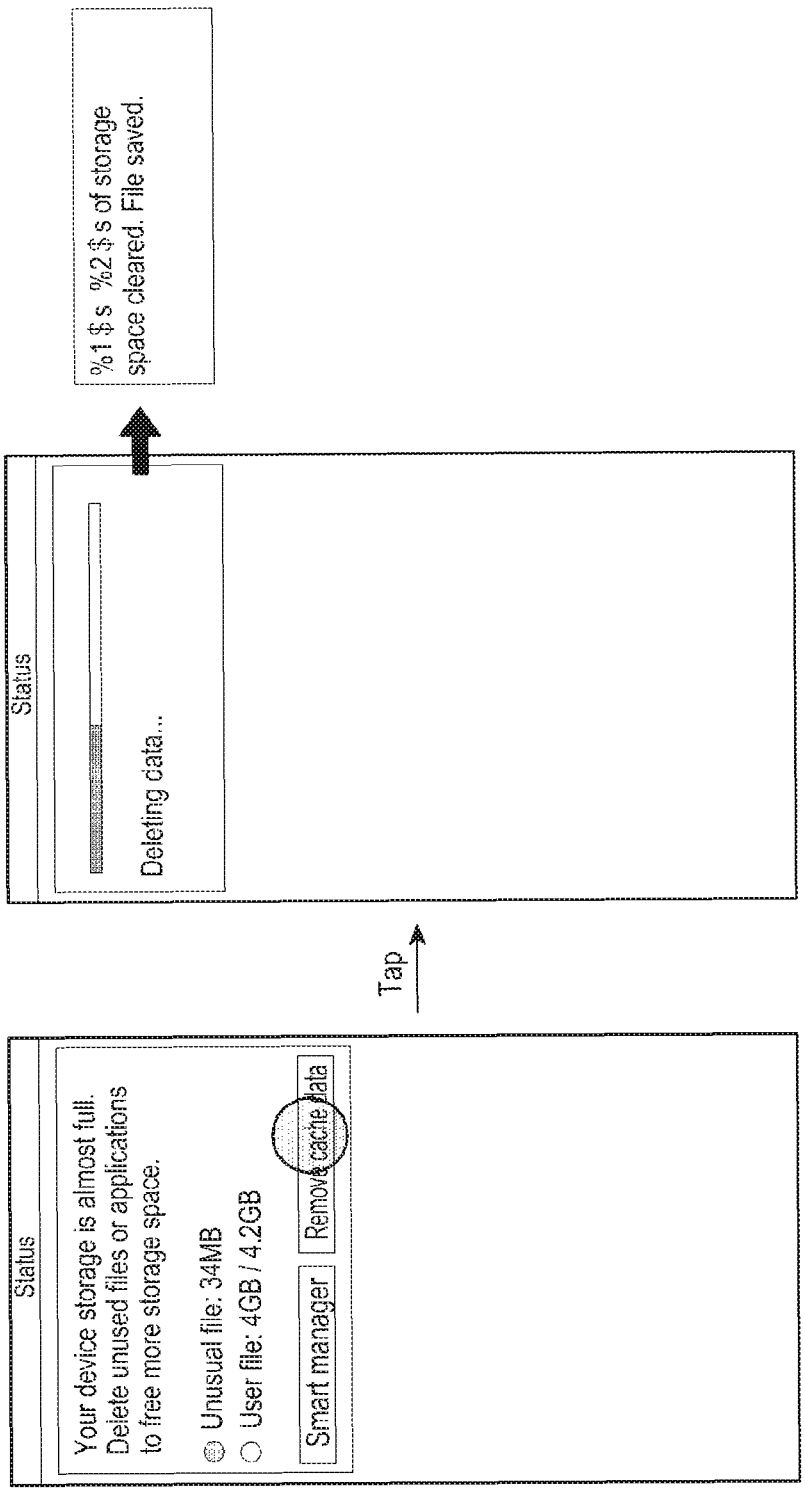

FIGS. 39A and 39B illustrate examples of giving a notification using a popup if a storage is used over a predetermined level. A criterion for giving a notification predefined or set by a user. A message indicating the lack of an available space and storage state information are displayed in the popup. A button for executing the smart manager or deleting a cache file may be displayed. After deletion of the cache data, the screen may return to the original screen.

A current consumption control operation for the battery managed by the smart manager of the electronic device according to embodiments of the present disclosure is the same as illustrated in FIGS. 9 through 16, and will be omitted here for conciseness.

FIGS. 40, 41A, 41B, 41C, 41D and 41E illustrate providing a smart manager of an electronic device as a widget according to embodiments of the present disclosure.

Figure 40:
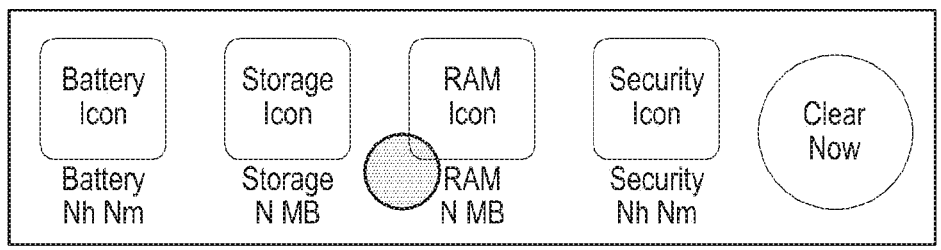

FIG. 40 illustrates an example of displaying the smart manager in the form of a widget. Category-specific state display icon and information is displayed, and a button for simply performing optimization with respect to one or more categories is further provided. When selecting a widget, the user may move to the main screen of the smart manager or to a screen of the smart manager corresponding to a selected category.

When software update is possible, Clean Now button is replaced with Software Update button 4101 on the main screen of the smart manager as illustrated in FIG. 41A. When the button Software Update 4101 is selected, a user confirmation popup is displayed as illustrated in FIG. 41B, and then a binary for update is downloaded from a server as illustrated in FIG. 41C. The user confirmation popup includes selection of a communication scheme for downloading. As illustrated in FIG. 41D, during downloading, the Software Update button 4101 may be replaced with a Clean Now button 4102. After completion of downloading, the CleaN Now button 4102 may be replaced with the Software Update button 4201 as illustrated in FIG. 41E.

As is apparent from the foregoing description, according to embodiments of the present disclosure, the electronic device and the method for managing power in the electronic device provides information about abnormal power consumption applications and a function of controlling those applications, allowing users to easily and quickly solving the unnecessary power consumption issue.

The embodiments disclosed herein have been provided for description and understanding of disclosed technical matters, and are not intended to limit the scope of the present disclosure. Therefore, it should be construed that the scope of the present disclosure includes any change or other embodiments based on the technical spirit of the present disclosure.

Although certain embodiments are described herein, it will be understood by those skilled in the art that various changes in form and detail may be made therein without departing from the spirit and scope of the embodiments, as defined by the appended claims.

What is claimed is:

1. An electronic device comprising:
   a battery;
   a display;
   a processor electrically connected with the battery and the display; and
   a memory which is electrically connected with the processor and stores at least one application,
   wherein the memory stores instructions which, when executed, cause the processor to:
   monitor power consumption of the at least one application during execution of the at least one application in an off state of the display, and
   display, on the display, information indicating whether a value of the power consumption exceeds a threshold, based on a result of the monitoring in response to the display entering an on state,
   wherein the information includes an indicator indicating that the power consumption of an application corresponding to the indicator exceeds the threshold.

2. The electronic device of claim 1, wherein the instructions further cause the processor to provide the information about whether the value of the power consumption exceeds the threshold on the display by using a popup window.

3. The electronic device of claim 2, wherein the popup window provides a user interface (UI) for selecting at least one of continuation of execution of the at least one application, termination of the at least one application, pause of execution of the at least one application, uninstallation of the at least one application, and function restriction of the at least one application.

4. The electronic device of claim 3, wherein the popup window displays a result of performing the at least one of the continuation of execution, termination, pause of execution, uninstallation, and function restriction with respect to the at least one application.

5. The electronic device of claim 1, wherein the instructions further cause the processor:
   to display an icon capable of executing the at least one application on the display; and
   to display the information about whether the value of the power consumption exceeds the threshold on or near the icon.

6. The electronic device of claim 1, wherein the instructions further cause the processor:
   to identify a category of the at least one application; and
   to display, on the display, information about whether the value of the power consumption exceeds a threshold that is preset for the category during a selected time.

7. The electronic device of claim 1, wherein the instructions further cause the processor:
   to store a frequency of use for the at least one applications and
   to display information about whether the use frequency exceeds a threshold for frequency of use or use history information based on at least a part of the frequency of use on the display.

8. The electronic device of claim 1, wherein the instructions further cause the processor to provide a user interface (UI) for enabling a setting of whether to display the information about whether the value of the power consumption exceeds the threshold on the display, or a UI for displaying at least one application running in the processor.

9. The electronic device of claim 1, wherein the instructions further cause the processor to display at least one application corresponding to the value of the power consumption exceeding the threshold or to provide a user interface (UI) capable of displaying the at least one application.

10. The electronic device of claim 9, wherein the at least one application corresponding to the value of the power consumption exceeding the threshold are displayed differently according to state and occurrence frequency of a resource.

11. A method for managing power in an electronic device, the method comprising:
    monitoring power consumption of at least one application during execution of the at least one application in an off state of a display of the electronic device; and
    displaying, on the display, information indicating whether a value of the power consumption exceeds a threshold, based on a result of the monitoring in response to the display entering an on state,
wherein the information includes an indicator indicating that the power consumption of an application corresponding to the indicator exceeds the threshold.

12. The method of claim 11, further comprising providing the information about whether the value of the power consumption exceeds the threshold on the display by using a popup window.

13. The method of claim 12, wherein the popup window provides a user interface (UI) for selecting at least one of continuation of execution of the at least one application, termination of the at least one application, pause of execution of the at least one application, uninstallation of the at least one application, and function restriction of the at least one application.

14. The method of claim 13, wherein the popup window displays a result of performing the at least one of the continuation of execution, termination, pause of execution, uninstallation, and function restriction with respect to the at least one application.

15. The method of claim 11, further comprising:
displaying an icon capable of executing the at least one application on the display; and
displaying the information about whether the value of the power consumption exceeds the threshold on or near the icon.

16. The method of claim 11, further comprising:
identifying a category of the at least one application; and
displaying, on the display, information about whether the value of the power consumption exceeds a threshold that is preset for the category during a selected time.

17. The method of claim 11, further comprising:
storing a frequency of use for the at least one application; and
displaying information about whether the use frequency exceeds a threshold for frequency of use or use history information based on at least a part of the frequency of use on the display.

18. The method of claim 11, further comprising:
providing a user interface (UI) for enabling a setting of whether to display the information about whether the value of the power consumption exceeds the threshold on the display or a UI for displaying at least one application running in the processor.

19. The method of claim 11, further comprising:
displaying at least one application corresponding to the value of the power consumption exceeding the threshold or providing a user interface (UI) capable of displaying the at least one application.

20. The method of claim 19, wherein the at least one application corresponding to the value of the power consumption exceeding the threshold are displayed differently according to state and occurrence frequency of a resource.

* * * * *